United States Patent [19]

David

[11] Patent Number: 4,854,990
[45] Date of Patent: Aug. 8, 1989

[54] METHOD FOR FABRICATING AND INSERTING REINFORCING SPIKES IN A 3-D REINFORCED STRUCTURE

[76] Inventor: Constant V. David, 4952 Field St., San Diego, Calif. 92110

[21] Appl. No.: 37,512

[22] Filed: Apr. 13, 1987

[51] Int. Cl.⁴ ............................................. B65H 54/00
[52] U.S. Cl. .................................... 156/173; 156/175; 156/425
[58] Field of Search ............... 156/173, 175, 425, 428, 156/429, 180; 428/105, 107, 109, 113, 367, 377; 242/7.02, 7.21

[56] References Cited

U.S. PATENT DOCUMENTS

| | | | |
|---|---|---|---|
| 3,577,294 | 5/1971 | David | 156/173 |
| 4,080,915 | 3/1978 | Bompard et al. | 242/7.21 X |
| 4,328,272 | 5/1982 | Maistre | 428/367 X |
| 4,366,658 | 1/1983 | Maistre | 428/105 X |
| 4,394,203 | 7/1983 | Bompard et al. | 242/7.21 X |
| 4,495,231 | 1/1985 | Laskaris et al. | 428/113 X |

*Primary Examiner*—Michael W. Ball
*Assistant Examiner*—Jeff H. Aftergut

[57] ABSTRACT

Method and apparatus for fabricating reinforcing spikes for insertion in a preferential direction into a structure reinforced in three directions substantially orthogonal. The structure is substantially a body of revolution and the reinforcements are provided by filaments made of high-strength high-elasticity-modulus materials. Strands made with such continuous filaments are wound helically in two generally perpendicular directions along a surface substantially parallel to both the external and internal body surfaces of revolution. The distance between these two surfaces is variable and defines the body thickness which may reach an appreciable percentage of the body diameter at certain stations. The spikes are made of parallel fiber segments bonded by a resin matrix so as to be stiff, and have two pointed ends. The spikes are forced to partially penetrate the structure during the strand winding process along a direction substantially perpendicular to a plane tangent to the structure surface where the spike is to penetrate the yet uncompleted structure. Winding of additional strands subsequently takes place between embedded spikes. The fibers of the radially-oriented spikes then constitute the third-dimensional reinforcing mode of the structure.

13 Claims, 5 Drawing Sheets

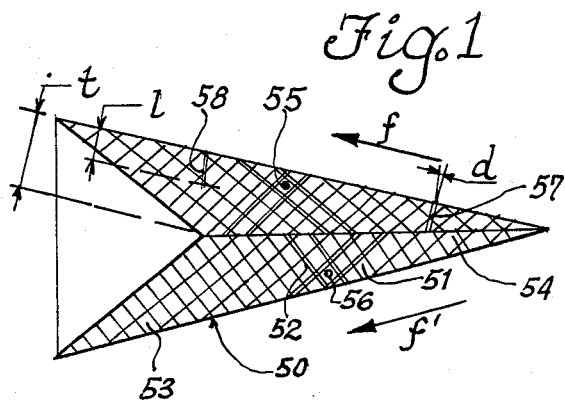
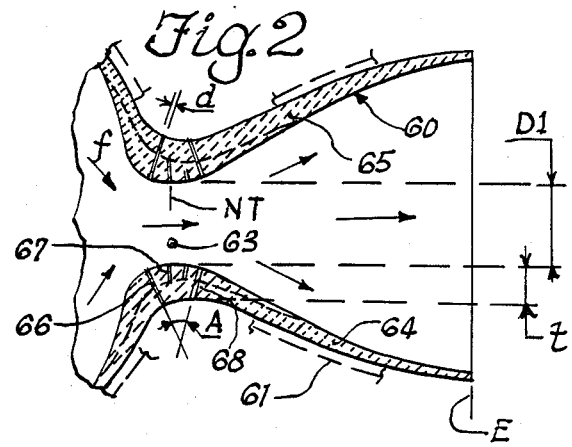
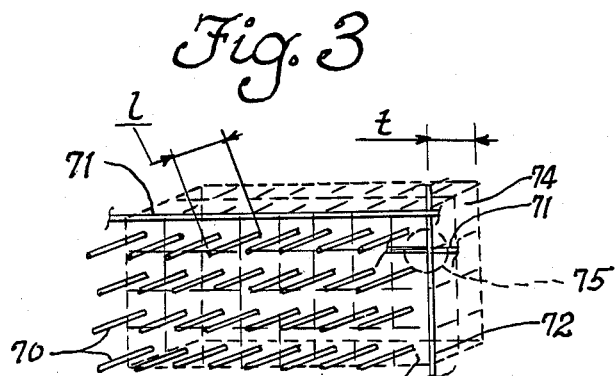
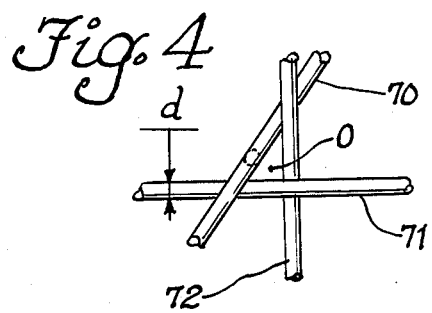
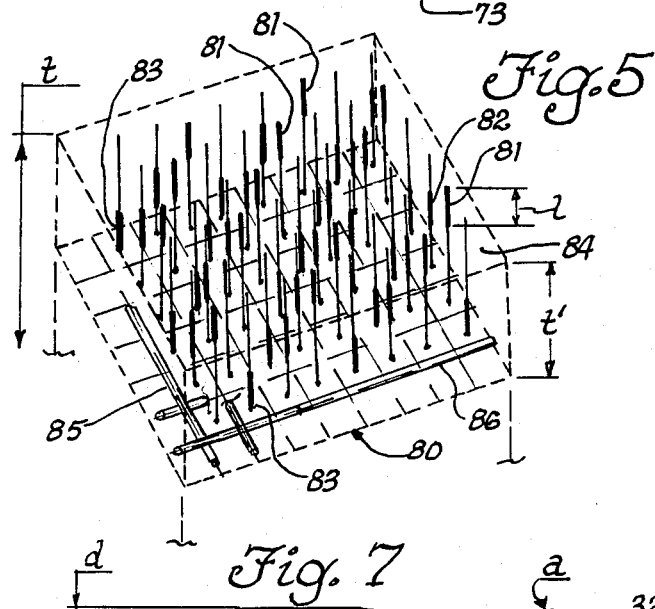
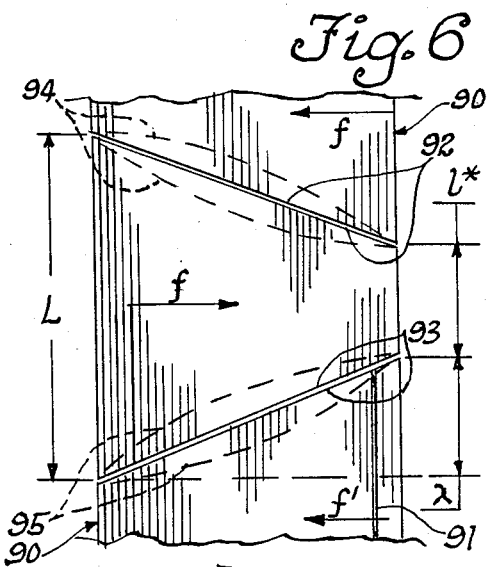
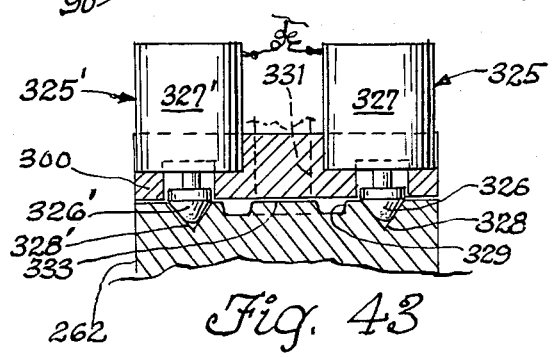

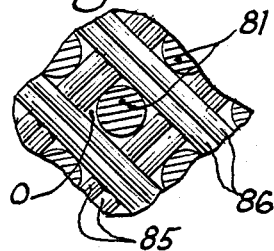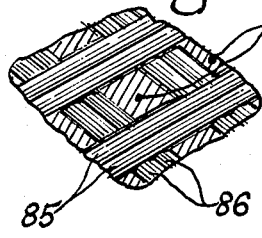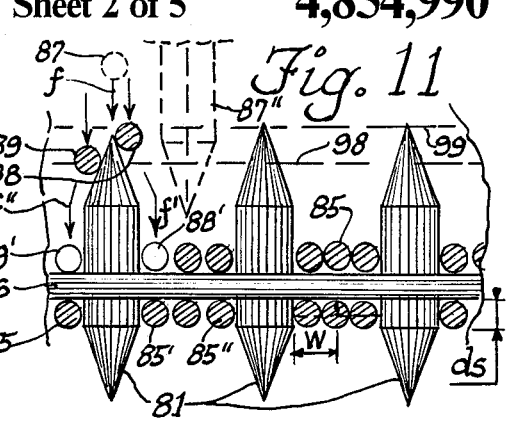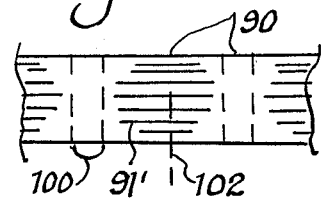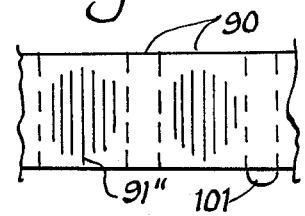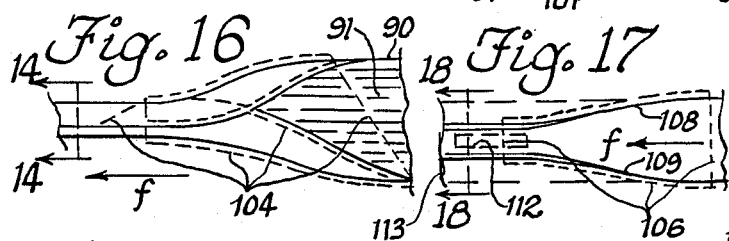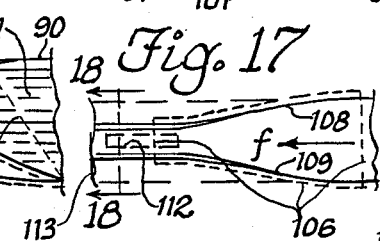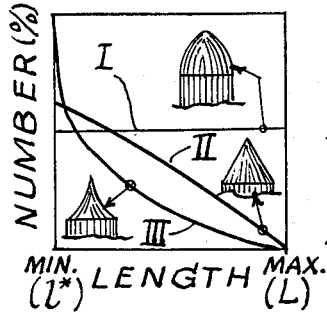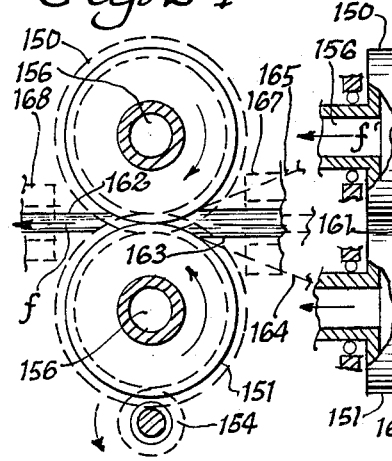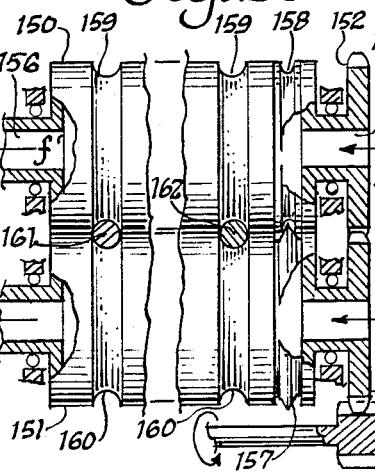

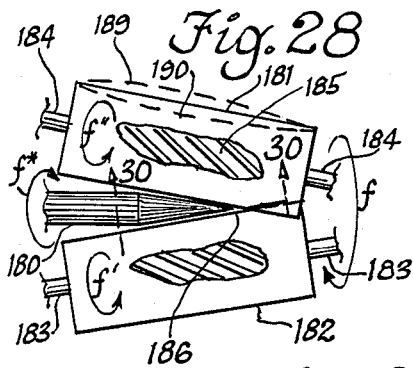
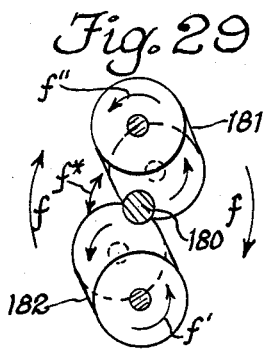
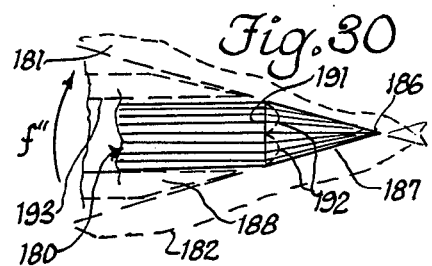
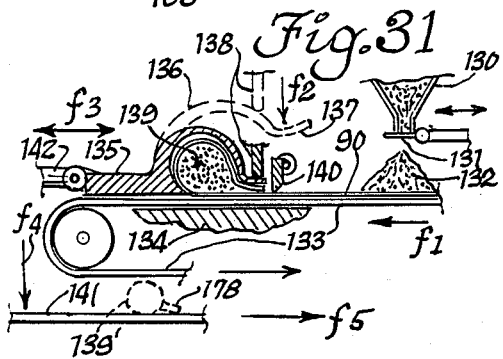
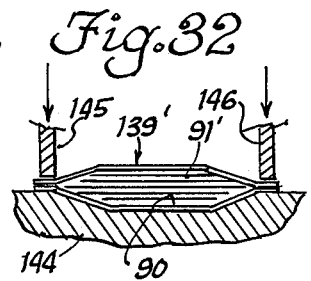
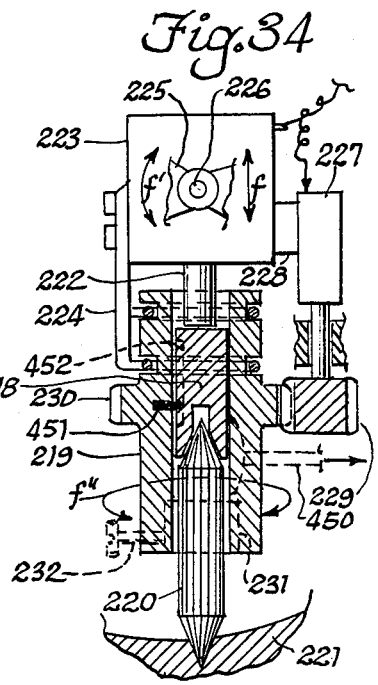
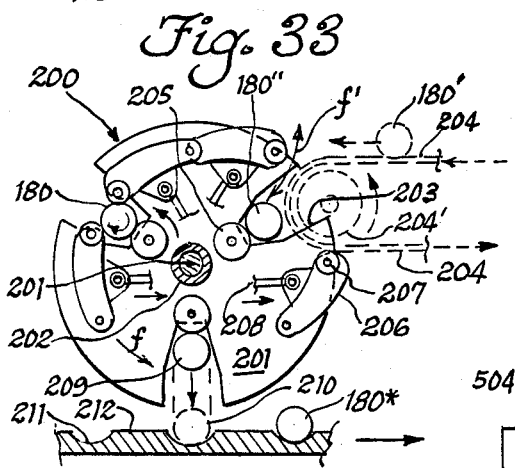
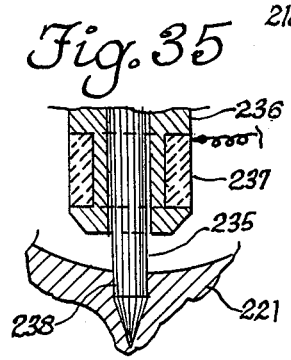
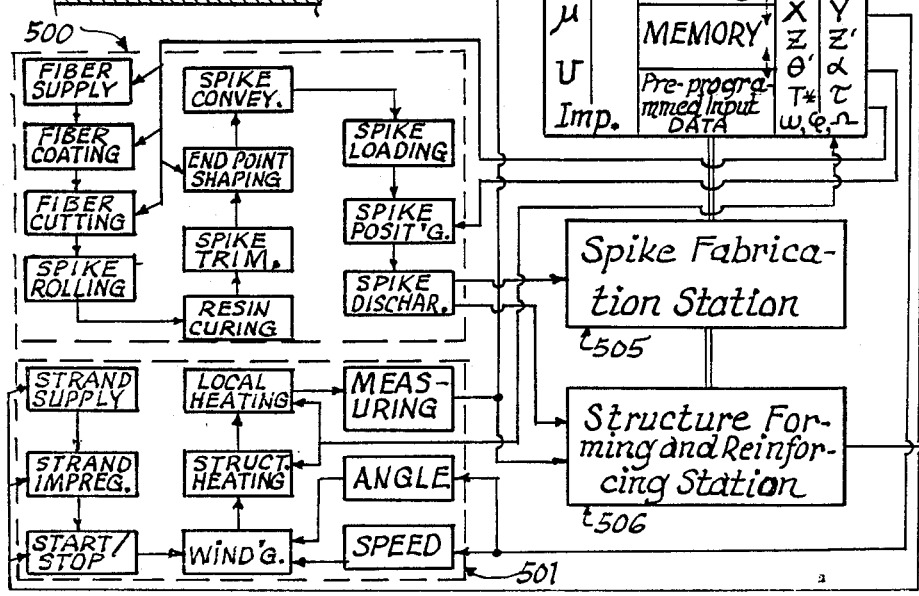
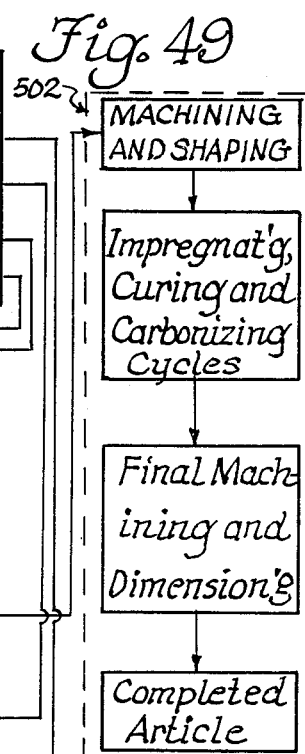

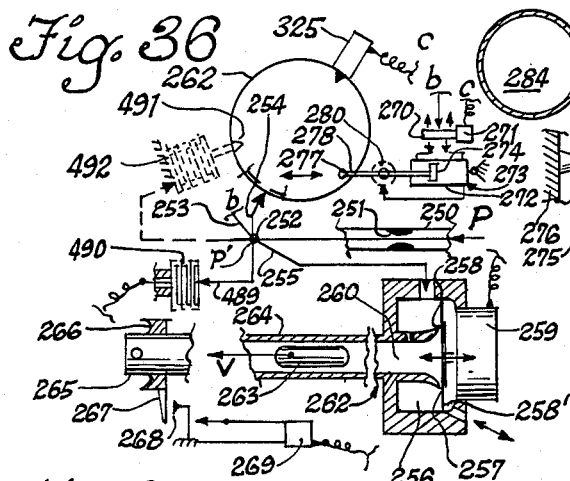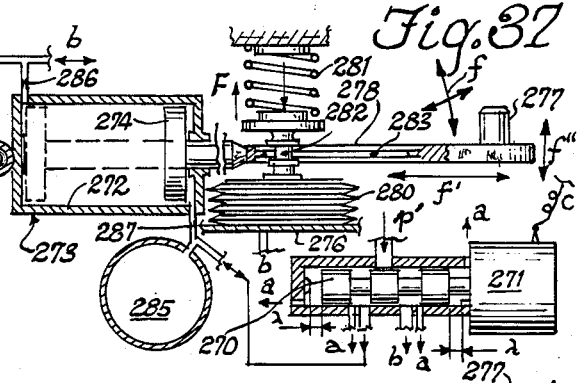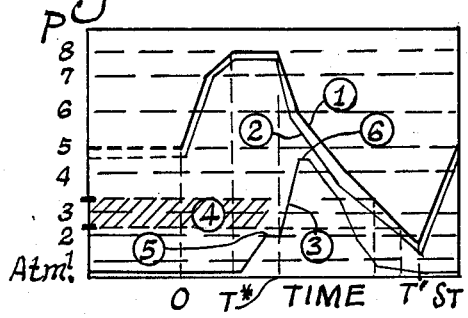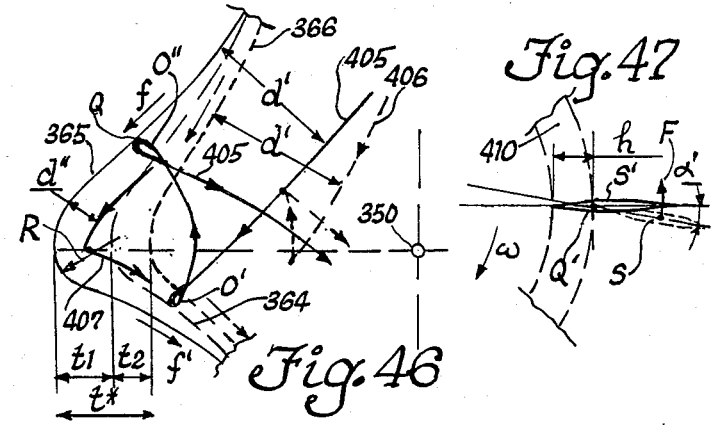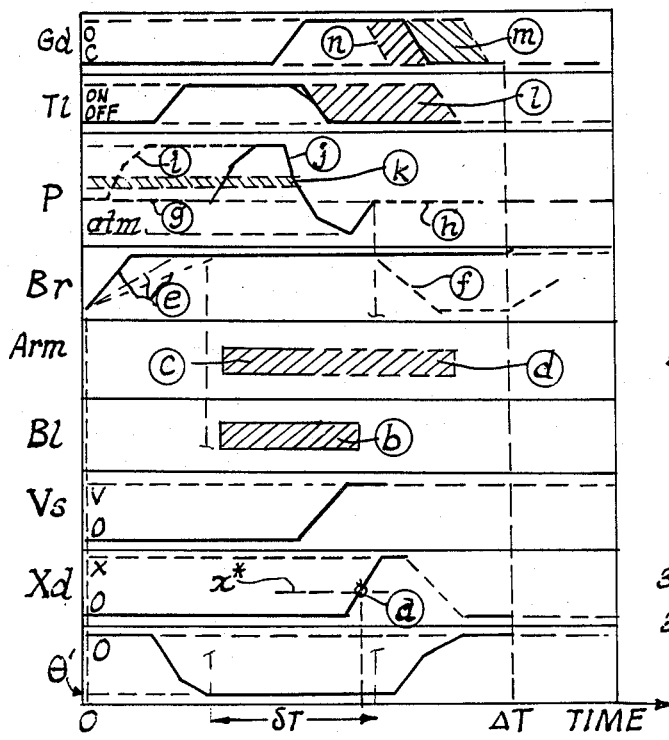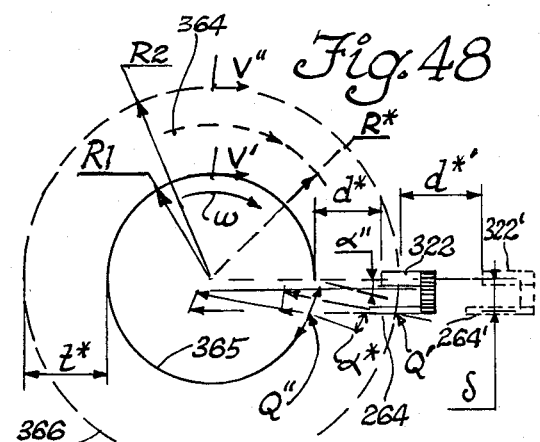

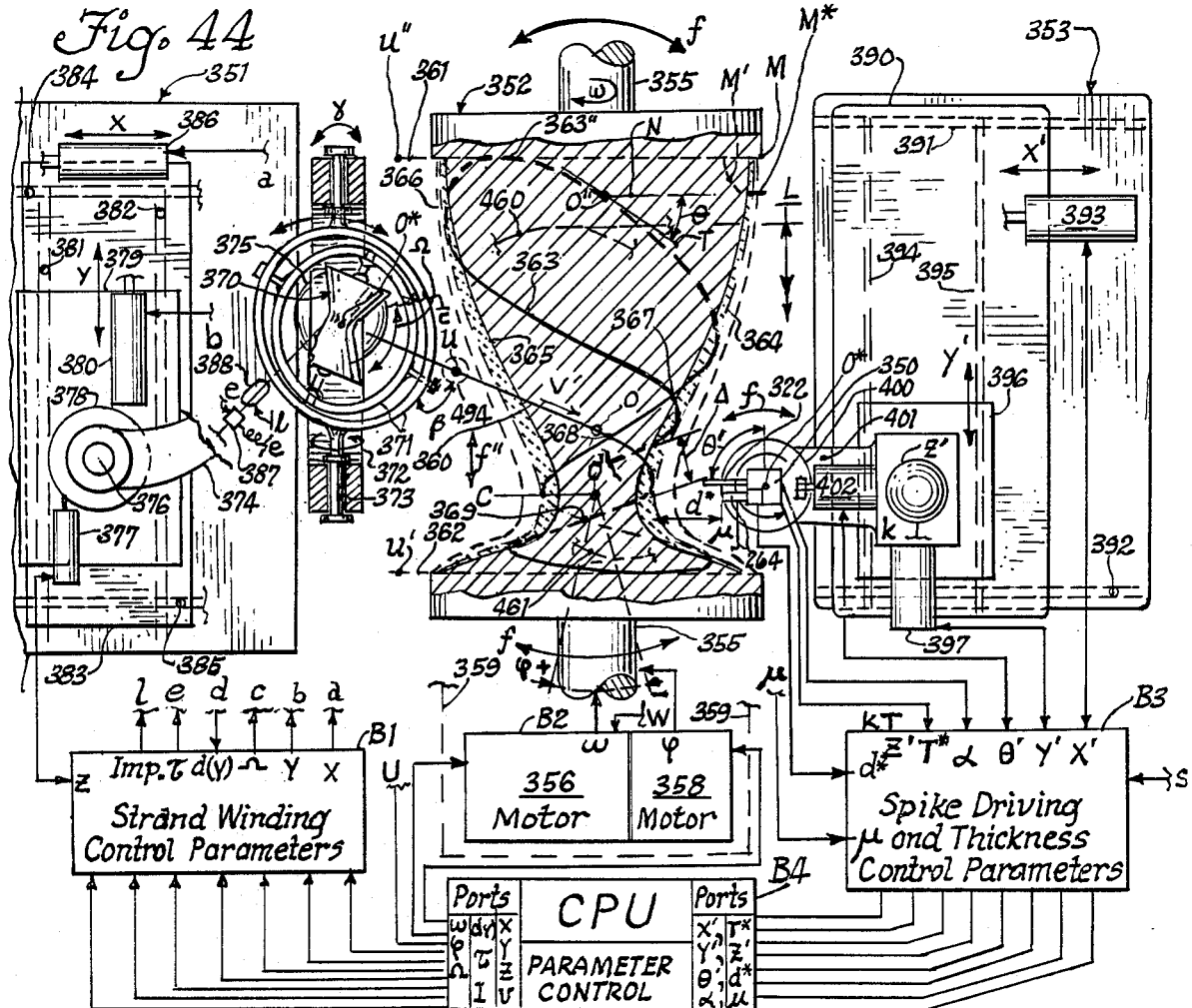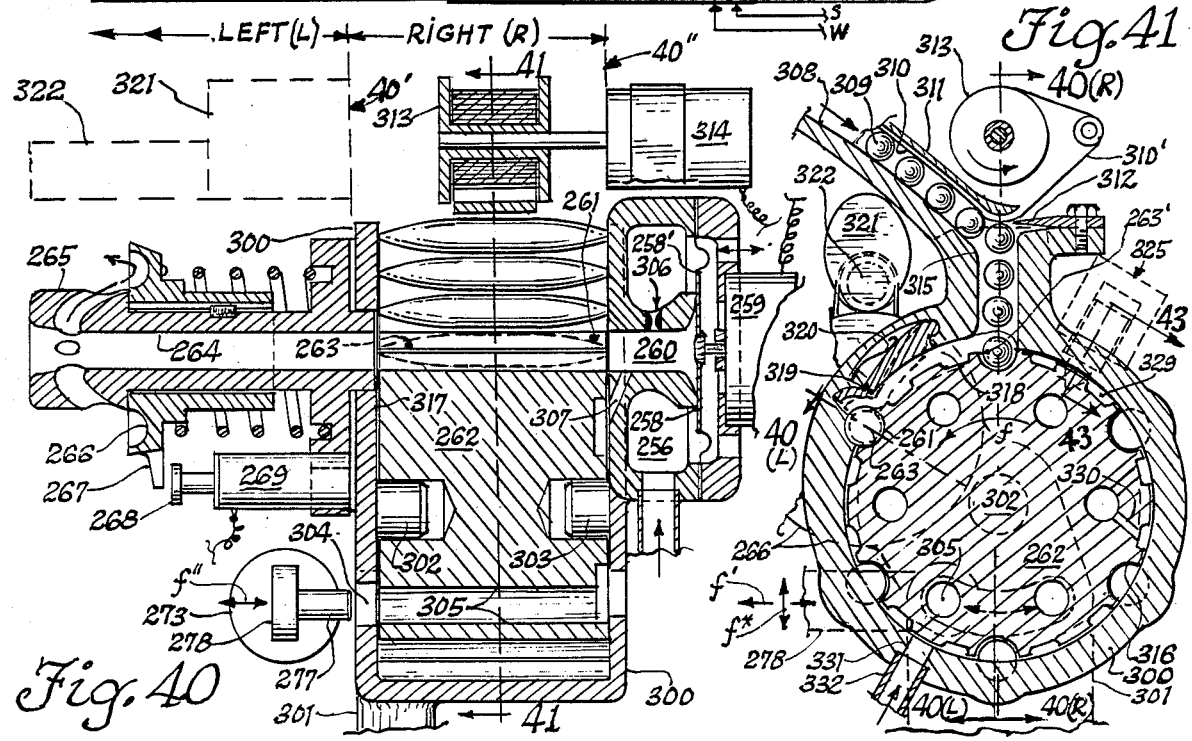

METHOD FOR FABRICATING AND INSERTING REINFORCING SPIKES IN A 3-D REINFORCED STRUCTURE

BACKGROUND OF THE INVENTION

Various manufacturing approaches are used for constructing structures in which the structure material is heterogeneous and consists of two basic types of materials, both in terms of shape and composition. One material type is in the form of high-strength high-elasticity-modulus filaments arranged substantially orthogonally so as to provide enhanced strength and stiffness in three basic or principal stress directions. The other material is used to interconnect the reinforcing filaments by means of surface bonding so as to transmit and distribute stress loadings between filaments along those three principal directions, and forms a matrix in which the reinforcements are embedded.

It is very difficult to fabricate thick sections of such reinforced material in which the reinforcing filaments and/or fibers are maintained straight throughout their lengths, in which the volume of matrix as percentage of the total volume is small and in which all three reinforcements are consistently in close proximity throughout the structure. A method for making such materials is described in my U.S. Pat. No. 3,577,294 entitled: METHOD FOR MAKING 3-D FILAMENT REINFORCED ARTICLES, but its application is limited to relatively thin shell sections. This limitation is imposed by the manner in which the filament winding is performed. A mandrel having an external surface covered with thin stiff bristles is used as a form upon which helically-wound filaments are laid, i.e. between the projecting bristles. The section thickness is thus limited by the bristle length. The latter is limited in turn by the risk that projecting bristles will be bent or broken by the filament being helically wound prior to being laid on the form. This risk augments compoundingly when the bristles are lengthened, because: (1) the degree of bending solicitation is higher when a bristle projects out farther, and (2) concomitantly, the resistance to bending of a bristle is highly reduced by an increase of its length.

The two compounding difficulties listed above are further increased if and when helical filament winding is to be performed about a form which exhibits a saddle-shape double curvature as is the case for rocket engine nozzles in the throat region. This becomes very apparent later in this disclosure. In addition, especially in the case of thick-shell structures, the proportion of radial to helically-wound reinforcing requirements may vary widely between locations near the internal surface and close to the external surface. It is practically impossible to adjust the nature and cross-section size of a continuous bristle along its length. Also, significantly increasing the diameter of individual radial reinforcing elements further facilitates the helical winding of thicker filament strands, which may then be programmable, wound so as to minimize the degree of physical interference earlier mentioned. The goals of the present invention are to provide a method and an apparatus which offer such possibilities, by using relatively short stubby spikes, instead of thin bristles, which are added to the structure while it is being constructed, at a required rate.

SUMMARY OF THE INVENTION

It is therefore a primary object of the present invention to provide a new and improved method and apparatus for fabricating and inserting reinforcing spikes in a 3-D filament-wound reinforced structure, during the winding process.

It is another object of this invention to provide a new and improved method and apparatus for fabricating such reinforcing spikes in a way which facilitates their insertion into the structure while being wound.

It is another object of this invention to provide a new and improved method and apparatus for inserting such reinforcing spikes into the structure so as to minimize interference with the filament winding operation.

It is another object of this invention to provide a new and improved method and apparatus for coordinating the spike fabrication and the structure thickness build-up resulting from the filament winding operation.

It is another object of this invention to provide a new and improved method and apparatus for coordinating and synchronizing the spike insertion and filament winding operations.

It is still another object of this invention to provide a new and improved method and apparatus for spike-reinforcing of 3-D reinforced structures which enable the adjustment of spike distribution along the structure thickness so as to better meet the operational requirements of the completed structure.

Other objects and many advantages of the present invention will become more apparent upon a reading of the following detailed description and an examination of the drawings wherein reference numerals designate like parts throughout this disclosure.

Accordingly, the present invention provides a method and an apparatus for continuously fabricating and inserting reinforcing spikes in a 3-D reinforced structure in the process of construction, in a manner compatible with the production of thick shell structures in which the degree of radially oriented reinforcement can be adjusted in a pre-programmed manner, as required.

DESCRIPTION OF THE DRAWINGS

FIG. 1 is a longitudinal sectional view of a nose cone of a re-entry vehicle, represented diagrammatically as example.

FIG. 2 is a longitudinal sectional view of a solid-fuel rocket engine nozzle lining insert shown as invention application example.

FIG. 3 is a perspective diagram of a thin-shell 3-D reinforced structure showing a typical reinforcement arrangement.

FIG. 4 is a perspective diagram showing the relative positions of three orthogonally-oriented reinforcing members.

FIG. 5 is a perspective diagram of a thick-shell 3-D reinforced structure showing a typical spike reinforcement arrangement in combination with a continuous-filament-based structure.

FIG. 6 is a plan view of thin-film tape loaded with fibers following the tape slicing operations.

FIG. 7 is an elevation view of a typical spike obtained from the rolling of a tape segment sliced along the dotted lines of FIG. 6 schematic drawing.

FIG. 8 is an elevation view of a typical spike obtained from the rolling of a tape segment sliced along the solid lines of FIG. 6 schematic drawing.

FIG. 9 is a partial sectional view of a round-section spike shown ideally located between intersecting wound strands.

FIG. 10 is a partial sectional view of a rhomboidal section spike shown ideally located between intersecting wound strands.

FIG. 11 is a partial elevation view of three spikes installed in a partially wound structure and indicates the two steps of further filament winding and of spike inserting.

FIG. 12 is a plan view of a thin-film tape loaded longitudinally showing laid pre-cut fiber segments.

FIG. 13 is a plan view of a thin-film tape loaded transversally showing laid pre-cut fiber segments.

FIG. 14 is a transversal section view of a spike taken along section line 14—14 of FIG. 16 and showing how a segment of fiber-loaded tape is rolled up.

FIG. 15 is a transversal sectional view of a spike showing how a segment of tape loaded with a bundle of fibers is caused to close for entrapping the fiber bundle.

FIG. 16 is a top view of the tape-rolling guide used for shaping the rolled-up spike of FIG. 14.

FIG. 17 is a top view of the tape-bending guide used for shaping the receptacle continuously formed by the tape of FIG. 18.

FIG. 18 is a transversal section view of a tape segment taken along section line 18—18 of FIG. 17 and showing how the segment is loaded with fiber segments.

FIG. 19 is a transversal sectional view of a fiber-loaded tape segment being longitudinally sealed off.

FIG. 20 is a schematic drawing showing how a fiber-loaded tape segment can be rolled up to form a spike.

FIG. 21 is a graphic representation of the influence of the shapes given to the tape segment sliced edges on the shapes of the ends of the rolled-up spike.

FIG. 22 is a partial plan view of inserted spikes indicating how the strands laid between rows of spikes may be tamped tight.

FIG. 23 is a partial elevation sectional view of two spikes and of strands laid therebetween taken along section line 23—23 of FIG. 22 and being tamped by the hammering head of a tamper.

FIG. 24 is an end view of a roller assembly showing how a continuous rod of spike material may be formed.

FIG. 25 is an elevation view of the roller assembly of FIG. 24 showing the roller driving and guiding modes.

FIG. 26 is a partial cross-sectional view of a first method of forming spikes between two cooperating rollers.

FIG. 27 is a partial cross-sectional view of a second method of forming spikes between two cooperating rollers.

FIG. 28 is a partial elevation view of two revolving cutters used for sharpening the spike ends.

FIG. 29 is an end view of the two cutters of FIG. 28.

FIG. 30 is a partial diagrammatic section view of one spike end being sharpened, taken along section line 30—30 of FIG. 28.

FIG. 31 is a diagrammatic drawing showing an alternate way of fiber-loading, forming, slicing off and delivering spikes for further processing.

FIG. 32 is a diagrammatic drawing showing how the ends of a spike may be sealed off for fiber segment entrapment.

FIG. 33 is a schematic illustration of a method of positioning and holding a spike during the sharpening of its two ends.

FIG. 34 is sectional elevation view of a hammer assembly for mechanically driving the spikes into the structure.

FIG. 35 is a partial elevation view of a punching tool used for pre-punching lodgings in the structure for housing spikes.

FIG. 36 is a schematic drawing showing the mechanisms used for coordinating the gas gun operation and its loading.

FIG. 37 is a schematic drawing showing the actuation mechanism used for loading the gas gun.

FIG. 38 is a top view of a linkage for assisting in the gas gun loading operation.

FIG. 39 is a timing diagram showing how the gas pressure varies during a typical gas gun operating cycle.

FIG. 40 is an elevation sectional view, taken along FIG. 4 section lines 40(L)—40(L) and 40(R)—40(R) of the gas gun and it's spike loading system.

FIG. 41 is a side sectional view taken along section line 41—41 of FIG. 40 of the gas gun and its spike loading system.

FIG. 42 is a partial plan view of the outer surface of the spike-holding barrel of the gas gun indicating where and how the barrel is locked in place during the spike discharge.

FIG. 43 is a partial sectional view of the barrel locking mechanism taken along section line 43—43 of FIG. 41.

FIG. 44 is a schematic drawing of a typical installation and system for winding filaments and driving spikes into the structure of a rocket engine nozzle insert being constructed.

FIG. 45 is a time diagram illustrating the temporal relationships between various operational steps during the nozzle making.

FIG. 46 is a diagram showing gun muzzle position variations as a function of structure external surface shape for typical separation distances between muzzle tip and structure surface.

FIG. 47 diagrammatically illustrates the influence of structure rotational velocity on spike orientation.

FIG. 48 is a diagram showing the positioning of the gas gun relatively to the structure during its operation.

FIG. 49 is a block diagram and flow chart combination showing how the spike fabrication and insertion in the structure are coordinated, synchronized and determined by a central processing unit with the filament winding of the structure.

DETAILED DESCRIPTION OF THE INVENTION

Referring to FIG. 1, the longitudinal section of a typical nose cone 50 illustrates the manner by which such structural body may be constructed. Ideally, orthogonally disposed reinforcing fibers such as 51 and 52 are embedded in a matrix material 53 so as to provide strength to the body structure. When the re-entry vehicle enters the upper atmosphere, thin air at very high temperature and velocity streams by the nose cone as shown by arrows f and f'. The shear stresses caused by such environment on the material located close to the external surface are very high. The reinforcing fibers provide the strength required to withstand such stresses. Heat causes material to ablate off the external surface and the rate of ablation must be kept low. These reinforcing fibers must prevent the tearing off of matrix chunks and thus slow down the ablation process. Nose cone bodies are of revolution, which means that fibers 51 and 52 would have to converge radially toward and all the way to centerline (or axis) 54. This is obviously impossible.

The present invention also provides orthogonally arranged reinforcing fibers, filaments and/or strands thereof. Fibers such as 51 and 52 may be rearranged to provide reinforcements such as 55 and 56 wound around the supporting substructure, and such as 57 and 58 oriented radially and normally to the external surface so as to provide good anti-ablation characteristics. Filaments 55 and 56 are continuous and helically wound to provide the hoop strength needed and spikes 57 and 58 provide strength in the radial direction, which is required when high tensile stresses are locally created in that direction. Because of the body shape, the length of the spikes varies considerably from spike 57 to spike 58 for instance. The thickness t of the body (or its equivalent) varies between such large extremes that again spikes 58 cannot possibly extend continuously from the external surface to centerline 54. Thus, it is necessary to vary the number of spikes per unit of conical area of substructure conical surfaces— or spike distribution density— in direct ratio with the distance of any point on that surface to centerline 54. This shows that the most practical way to meet such requirement is to use short spikes in increasing number, starting from centerline 54 outward. The winding of filaments 55 and 56 is also rendered much easier in the process. Diameter d of a spike can then be kept constant throughout the spike length 1. The ratio between 1 and d may thus remain low for all spikes, which augments their stiffness.

FIG. 2 represents a second example of a 3-D thick reinforced structure in which the thickness varies considerably between stations, e.g. rocket engine nozzle throat NT and nozzle exhaust E stations. The rocket engine nozzle insert 60 is a monolith structure that may be supported by a metal structure 61 and serves to isolate it from hot high-pressure gases 63 exhausted at high velocity. Again, the internal surface of insert 60 is exposed to a stream of high velocity gases that may here contain particulate matter. Such environment causes both ablation and erosion which combine to impose stringent structural requirements on the insert material under elevated temperature conditions. A graphite or carbon matrix material, reinforced by high-strength high-elasticity-modulus filaments of graphite or carbon, provides an ideal composite material for such application. Because carbon and graphite are chemically identical and differ only in the physical arrangement of their atoms and because they could be used interchangeably for the purpose of this disclosure, the appellation carbon is generally used in the following text. Other suitable materials can be used for similar applications, i.e. boron, silica, etc.., for all reinforcing materials, be it in wound strands or spikes. Also, for ease of distinction and easy recognition, the following terms are used in this disclosure: (1) "strands" for winding purpose which consist of continuous carbon filaments bonded by a plastic resin which may be then only partially cured, and (2) "fibers" and "fiber segments" in the fabrication of the spikes, and which are bundled together in parallel manner and bonded by a plastic resin which may also be then only partially cured.

The advantageous structural and thermal attributes of the reinforcing materials embedded in both strands and spikes are well known in the art, so is the rationale for their use in the applications of the present invention disclosed herein. Further elaboration is thus deemed beyond the scope of this disclosure. The same applies to the matrix materials binding the strands and spikes together, as well as to the matrix materials binding fibers and filaments together in either spikes and strands. For the purpose of this disclosure, both matrix materials are assumed to be a partially cured plastic resin which becomes subsequently fully cured and then pyrolyzed under suitable pressure and temperature conditions, as is well known in the art, so as to produce a carbon or graphite matrix material having suitable properties. Hereinafter, again the appellation "carbon" is used to define the end product corresponding to densified almost void-free homogeneous materials. The process is herein referred to as carbonization in a generic fashion. Various types of plastic resins are suitable for such treatment and are hereinafter referred to as "resin". It is also assumed that the selection of such resins is made so as to insure adequate bonding with the fibers and filaments, and satisfactory compatibility with the matrix resin. Finally, the solid-fuel rocket engine nozzle insert configuration of FIG. 2 is hereinafter used as a typical example of the present invention application, because thick shell sections are required and double-curvature saddle-shaped are difficult to filament-wind, especially in combination with the use of reinforcing radial spikes.

When insert 60 construction is completed, the cross-section shown in FIG. 2 represents a realistic image of the article that is then ready for carbonization and densification. The completed base structure is characterized by a resin matrix 64 embedding a plurality of helically-wound strands such as 65. These strands are laid to form substantially parallel layers between the internal and external surfaces of revolution of the insert. The strand layers are interconnected by radially reinforcing spikes such as 66 and 67. For illustrative purpose, long spike 66 is shown extending continuously from the internal to the external surfaces of the structure, whereas shorter spikes 67 stop halfway between the internal and external surfaces. Angle A formed by two long spikes 66 and 68 serves to typify: (1) why the spike density distribution must vary and be adjusted between the two surfaces, and (2) why the winding of strands 65, at the beginning of the winding operation, would present great difficulty on account of the presence of then-projecting long spikes. To provide good antiablation and shear resistance characteristics, the inner ends of the spikes must remain quasi normal to the insert internal surface, even after a substantial amount of insert material has ablated away. For the first two reasons and to circumvent such difficulties, using long spikes such as 67 and 68 is not considered.

However, readers will readily understand why and how a plurality of short spikes sized and arranged to provide the general configuration shown by spikes 66, 67 and 68 will prove satisfactory from the standpoints of both spike distribution-density adjustment and strand winding. It should be mentioned at this juncture that the ideal spike distribution density required also varies along the shell thickness and according to the station along the nozzle longitudinal axis of symmetry. A model for the description and discussion to follow is now defined. The method and apparatus therefor described herein apply equally well to other 3-D reinforced articles of different forms and compositions. The limitations imposed by the nature and function of a solid-fuel rocket engine nozzle insert should not be construed as limitations imposed on the scope of the present invention. The fabrication and insertion of reinforcing spikes in a helically-wound structure during the manufacturing process thereof are herein based on the production of a typical article which represents only a typical example of an application of the present invention. The description of the various spike fabrication and insertion steps and apparatus embodiments therefor may now proceed.

FIG. 3–5 illustrate in the most general manner how a developed section of a 3-D shell structure would appear without the matrix material, with the reinforcements in place. FIG. 3 pertains to a thin-shell in which length 1 of spikes such as 70 is the same for all spikes and equal to the shell thickness t. It corresponds to a thin shell fabricated according to the method described in my cited U.S. Pat. Ser. No. 3,577,294 and is shown for comparison purpose only. Orthogonally-laid continuous strands 71 and 72 correspond to the helically-wound reinforcements. Surfaces 73 and 74 represent the shell internal and external surfaces. A nodule 75 indicated by a dotted-line circle is shown enlarged in FIG. 4 for clarification. For simplification purpose, spike 70 and strands 71 and 72 have the same diameter d. In actuality, the three reinforcing members may or may not be in contact, although they share a finite common contact area in the most part of the shell. Ideally though they are depicted as circumscribing a small volume 0 of the matrix material which contributes to their bonding. This nodular arrangement also applies to any group of contiguous three reinforcing members— one spike and two strands— shown in FIG. 5 which depicts a thick-shell section 80.

The shell thickness t may correspond to several lengths 1 of any spike. All spikes are shown having the same length for ease of illustration. Assuming that top surface 84 is the completed shell internal surface and is used as starting reference surface, spikes such as 81 would be the first ones to be inserted, then spikes such as 82, then spikes such as 83, and so on. The shell external surface is not shown but is graphically referred to by the total thickness t dimension indication. Thickness t' corresponds to three "layers" of spikes, or three spike lengths. The number of wound strand layers would be much more than three, typically. These strands such as 85 and 86 may have diameters considerably smaller than the spike diameters d which may vary from one spike "layer" to the next according the article application requirements. Thus, several strands may be laid adjacently between two contiguous spikes, as will be shown later. FIG. 6 illustrates developed adjacent segments of a thin film of resin shaped in the form of a tape 90 having an adhesive side on which continuous fibers such as 91 are laid and uniformly dispersed, parallel to the tape edges. The fibers adhere to the tape which is then cut or sliced into segments. The slicing contours determine the lengths of the various fiber segments in the tape segment and ultimately the shape of the pointed end that the spike acquires when the tape segment is rolled up like a cigar. For example, a straight line slicing shown by a pair of solid lines such as 92 and 93 will result in "bullet-shaped" spike ends when the segment is rolled in the directions of arrows f. Slicing the loaded tape along a pair of dotted lines such as 94 and 95 results in conical spike ends.

The rolling operation of a loaded tape segment, as described above, produces spikes such as those depicted in FIG. 7 (conical ends) and 8 (elongated or slender bullet-shaped ends). The tape slicing may be programmed so as to give each spike one conical end and one slender bullet-shaped end. However, a final shaping step in the spike fabrication will determine the exact final shapes of both pointed ends of a spike, as described later. In any event, a completed spike is characterized by the dimensions shown in FIG. 6, 7 and 8, i.e. a diameter d, a length $1^*$ of the cylindrical section, two lengths $\lambda$ of the pointed end sections and an angle "a" of the point. The overall spike length L is equal to $1^*+2\lambda$. Slender bullet-shaped ends are further characterized by a radius of curvature R of the spike end profile. In the case of FIG. 8 spike shape, the spike profile may be oblong so that $1^*=0$ and $L=2\lambda'$, $\lambda'$ being larger than $\lambda$ for identical values of L.

FIG. 9 and 10 represent top views of a spike section taken immediately above a layer of strands. Spikes 81 of FIG. 9 have a circular cross-section. Thus theoretically, matrix-void space 0 of FIG. 4 appears as area 0 in each one of the four corners of the square formed by the strand inner edges (sides of the square) and constitute a structural deficiency. Spikes 81' of FIG. 10 on the contrary have a cross-section shaped like a lozenge. The spike is oriented with respect to the two strand winding directions so that the lozenge sides are parallel to the strand inner sides. As FIG. 10 drawing shows this allows the complete elimination of void areas 0, resulting theoretically in a structurally more efficient structure and thus easier to densify.

FIG. 11 schematically indicates the manner in which three spikes, three strand layers already in place, strands being wound and a spike to be added later physically relate in a side view representation of the strand laying process. Spikes 81 are firmly embedded in the substructure formed by strands 85 and 86, and like layers thereof underneath. Individual strands loops 88' and 89' have not yet been laid but are about to be. They are represented by strands 88 and 89 shown sliding along the sides of first spike 81 on the left in the directions f' and f'' respectively. As is later discussed, the possibility of a strand section such as 87 approaching the upper end of first spike 81 is to be prevented for obvious reasons. However, such possibility is acceptable in the case of tape winding in which individual filaments forming the tape can easily be divided and separated without causing problems. As the strand winding proceeds, the upper surface formed by a subsequent strand layer reaches a level between lines 98 and 99. At such time, if the structure thickness has not yet been reached, an additional "layer" of spikes is inserted as exemplified by spike 87'' shown in phantom lines, i.e. not being yet in place. At that time it becomes less objectionable for the lower pointed end of spike 87'' to penetrate and split a strand already laid in place lengthwise, for reasons evident to readers familiar with the art.

FIG. 12 to 20 diagrammatically illustrate fabrication steps of various methods used for forming round-sectioned spikes. FIG. 12 shows a plurality of pre-cut fiber-segments 91' laid on tape 90, parallel to the tape edges. The relationship between fiber-segment lengths and numerical distribution or density distribution thereof is adjusted so as to approximate the spike end shape desired. Space 100 bounded by phantom lines is free of fibers and is reserved for slicing. FIG. 13 depicts a similar arrangement, but with the fiber-segments being laid perpendicularly to the tape edges. The tape slicing occurs in spaces such as 101 also left free of fibers.

FIG. 14 and 16 indicate how fiber-loaded tape 90 of FIG. 12 may be rolled up continuously prior to the slicing off of individual tape segments. The rolled-up tape section along line 102 of FIG. 12 is presented in FIG. 14 and shows the tape segment being sealed by the application of pressure in arrow f direction along the tape segment outer edge 103. Fiber-segments 91' are trapped inside the film (tape 90) spiraling plies. The spiraling rolling up of loaded tape 90 is accomplished by means of the converging spiraling convolutions of guide 104 (dotted lines) through which the rolled-up tape is pulled in arrow f direction by means not shown, but well known in the art. This forming process applies equally well to a continuous tape loaded with continuous fibers or segmented fibers. Differences in subsequent processing steps will become clear later. In either case, the rolled-up tape is further heat treated under pressure so as to cure the resin and eliminate voids therein.

FIG. 15 illustrates how tape 90 of FIG. 12 may be loaded with precut resin-coated fibers segments so as to form a bundle of fiber segments 91' disposed within the bundle cross-section profile defined by phantom line 105. Again, the loaded tape is pulled in arrow f direction through shaped guide 106 of FIG. 17 adapted to force edges 108 and 109 to curl up as shown in FIG. 15 so as to almost join at the top, leaving only a narrow gap 107 between them and entrapping the fiber segments in the process. The emerging rod is then further heat treated under pressure as previously indicated. Segments of such rod can be cut off to provide spike rough bodies for further machining and shaping.

Forming guide 106 of FIG. 17 can also be shaped to impose on an unloaded tape a U-shape longitudinally as shown in FIG. 18. A bunch of segmented resin-coated fibers 110 of the right lengths are dropped from a feeder outlet 111 into the U-shaped receptacle so as to occupy the space 112 shown in phantom lines in FIG. 17. At the exit thereof past station 113, the top lips of the U-shaped receptacle are pressed together in the directions of the arrows by heated rollers 114 and 115, as indicated in FIG. 19, so as to seal off the bunch of fiber segments. Again, heat and pressure can be applied concurrently so as to cure the resin and eliminate voids for reasons previously stated.

FIG. 20 illustrates how a precut tape segment 116 can be rolled so that the loaded tape segments produced by the fabrication steps depicted in either FIG. 6 or FIG. 13 may result in formed rough spike bodies ready for further processing. In this instance, a thin rod 117 of continuous fibers coated with adhesive resin and rotating according to arrow f is caused to contact the long edge of segment 116 and entrain it into a rolling motion in the direction of arrow f'. This can be accomplished by means of conveyor belt 118 moving in the direction of arrow f'' and which is caused to move up when the long edge of segment 116 reaches the station where rod 117 spins, so as to establish the contact earlier mentioned. When the rolling up step is completed, the formed rough body of spike 120 is freed by cutting spike 120 off protruding rod 117 with cutting tool 119. For ease of representation, thin rod 117 is shown having moved, whereas spinning rod 117 always remains in the same position.

FIG. 31 illustrates an alternate method of loading and sealing tape segments. In this method, tape 90 is loaded with segmented fibers in the manner shown in FIG. 13 by means of feeder 130 equipped with a trap door 131 that is caused to let a bunch of fiber segments 132 fall on tape 90 which is supported by conveyor belt 133 guided by structure 134. Tape 90 is rigid enough to be pushed in the direction of arrow f1 so as to meet a shoe-shaped forming tool 135 having a flexible partially circular extension 136 terminated with a hot lip 137. Actuated member 138 may programmably cause lip 137 to move down in arrow f2 direction so as to apply pressure and heat on the free end of tape 90 when the latter becomes curled as depicted by the solid line profile of a typical spike cross-section 139. After this happens, slicing tool 140 cuts spike body 139 loose and member 138 is retracted. Shoe 135 is pulled back along arrow f3 by actuating rod 142 so as to allow the spike body to fall along arrow f4 on a second conveyor belt 141 moving along arrow f5 direction to be conveyed to a subsequent processing station. The rough body 139' of the spike now needs to be trimmed, end sealed, heat-and pressure-treated, machined and end-shaped.

FIG. 32 illustrates how the rough body of a spike can be sealed at both ends. The rough trimmed body of a spike is conveyed onto a supporting form 144. Two heated pressure members 145 and 146 are simultaneously actuated in the directions of the arrows to apply heat and pressure on the unloaded end portions of body 139' formed by tape 90 segment and fiber segments 91'.

FIG. 24 to 27 present an alternate way to form rough bodies of spikes, in the form of either a continuous rod which needs cutting off after resin curing and void elimination or rough spike bodies that require only trimming and end shaping. This method is particularly suitable for forming prismatically shaped spikes as shown in FIG. 26 and 27. FIG. 24 depicts an end view of an assembly of two contrarotating drums 150 and 151 forced to remain in contact by means well known in the art and thus not shown and FIG. 25 shows the elevation view of this assembly. Each drum is equipped with driving and synchronizing gears 152 and 153 driven in turn by drive gear 154. Both drums are hollow and contain hot steam ducted in through openings such as 155 and exhausted thru openings such as 156. Two matching and cooperating groove-tongue arrangements 157 and 158 extend around the drum circumferences and engage so as to maintain the drums in a correct relative longitudinal position so that each pair of spike forming grooves 159 and 160 remain registered. A plurality of spike bodies such as 161 and 162 are then formed by simultaneously applying heat and pressure on to a bundle of partially-cured-resin-coated fibers 163. Each continuous bundle is pressed between two films 164 and 165 fed simultaneously between the drums so as to enclose each bundle. Two heating stations 167 and 168 provide long term heating, whereas the drums provide short term heating but at higher temperatures. Arrows such as f indicate directions of motion and displacement. Because half-circular grooves 159 and 160 are endless in the drum configurations of FIG. 24 and 25, continuous rods of constant sections are produced, they may later be cut to required lengths, thus providing spike rough bodies for further machining and shaping. The reader familiar with the art will see how the cross-sections of grooves 159 and 160 can be shaped to each represent half of a lozenge so as to produce prismatically-shaped rods and thereby ultimately spikes.

FIG. 26 and 27 depict portions of the two drums having grooves 170, 171, 172 and 173 shaped in a manner such that the spike rough bodies are formed in one operation. In FIG. 26, two continuous tapes 174 and 174' entrap a bunch of fiber segments in the manner shown in FIG. 13, whereas uncut and partially rolled loaded tape of FIG. 12 is fed between the drums of FIG.

27. In FIG. 26, the spike axes are parallel to the drum axes, in FIG. 27, the spike axes are perpendicular to the drum axes. As they exit from between the drums, in both instances, the spike bodies still need sectioning off from the tapes, machining and shaping. Resin curing stations such as 168 of FIG. 24, not shown in FIG. 26 and 27, then provide the long term heating still required. At this juncture, only the machining and the final shaping of the spike formed but rough bodies remain to be described.

The trimming of side tabs such as 176 of FIG. 26, 177 of FIG. 19 and 178 of FIG. 31 left on spike rough bodies upon completion of the resin curing step is a minor operation which can be accomplished by means well known in the art, thus needing no further elaboration. However, it should be mentioned that side tabs projecting outward must be removed so as to facilitate the gripping of the spike during the end shaping operation, next described.

FIG. 28, 29, 30 and 33 schematically depict typical means for machining the spike ends and holding the spike therefor. A modified version of a desk top manually-operated pencil sharpener is used as model for describing spike end point shaping means which are adaptable to both cylindrical and prismatic spike body cross-sections. In such shaping means embodiment, each end of spike 180 is caused to be pushed and held against two helically-grooved cylindrical shaving rollers 181 and 182 rotating in the same direction (f' and f"). Both rollers are supported by shafts 183 and 184, respectively, which are centered on and guided by a structure —not shown here, being well known in the art—that revolves as shown by arrow f. This structure rotation causes the roller rotation by gear means not shown, also well known in the art. The external cylindrical surfaces of the shaving rollers exhibit small grooves having cutting lips such as 185 for shaving a thin layer of material off the spike pointed end, thus sharpening and giving it its final shape. The spike may be caused to rotate in a direction f* opposed to f'-f" directions so as to cause end point 186 to be located on the spike longitudinal axis.

FIG. 29 represents an end view of FIG. 28 arrangement. The arrows and call-out numericals are kept unchanged for easy identification. FIG. 30 shows a schematic detail of the spike end in both cases of a cylindrical spike (solid lines) and a prismatic spike (phantom lines). In all instances, this sharpening method generates a pointed surface of revolution, conical if rollers 181 and 182 are cylindrical. To obtain pointed end shapes departing from a conical shape, the surface profile of shaving rollers 181 and 182 may be identically shaped as shown by phantom lines 189 or 190. In any event, intersections of the flat faces of a prismatic spike and of a quasi-conical surface of revolution 187 result in straight line 191 for cylindrical spikes and phantom line contours 192 for prismatic spikes. This minor difference does not affect the sliding of strands being wound along spike sides, as illustrated in FIG. 11, but renders end point shaping universal, at least in the case of the present invention application. The inner surface 193 of spike-holding structure 188 needs only be shaped to conform to the spike outer surface so as to properly guide and support the spike. As earlier mentioned, structure 188 may rotate, but may not have to in the case of cylindrical spikes as will become clear below.

The drawing of FIG. 33 gives the reason therefor. This schematic drawing describes how spikes are conveyed into place and supported for and during the end point shaping operation. To that effect, a two-flange spool 200—shown sectioned along a plane parallel to the flanges surfaces, half-way between the flanges—rotates about a central shaft 201 supporting the spool hub 202. Between and on both flanges, three operating stations are equidistancingly located for: (1) receiving a spike rough body, (2) holding the spike rough body in position for sharpening, and (3) discharging the sharpened spike. Openings such as 203 enable the free passage of the spike. Gravity is used for positioning the spike in the receiving station or unloading the spike in the discharging station. Positive actuation may also be used as readers familiar with the art well know. Conveyor belt 204 feeds the spike rough bodies 180' so that they fall in opening 203 to come into contact with roller 205 which is then still. Conveyor belt 204 and its roller 204' actuating support and a supporting structure thereof (not shown, well known in the art) have a width smaller than the distance separating the two flanges, so as to avoid mechanical interferences and provide any necessary clearances.

As time programmed by means well known in the art, spool 200 is caused by actuation means not shown but equally well known in the art to rotate 120 degrees in the direction of arrow f so as to bring the spike to the second station. During such rotation, two cooperating arms such as 206, each equipped with an end roller such as 207, are caused to move in the closing direction of arrow f' by actuating rods such as 208, timely and automatically. When the spike rough body 180 is secured in the second station, its ends projecting outwardly away from spool 200 flanges, two sharpening assemblies such as that depicted in FIG. 28–30 located on each side of spool 200 are actuated simultaneously so as to engage the spike rough body ends. Roller 205 becomes engaged by a rotating driving mechanism so as to: (1) cause spike 180 to rotate (case of a cylindrical spike), or (2) cause structure 188 to rotate (case of a prismatic cross-section). In the latter case, roller 205 does not contact the spike body directly for rotation but only supports its. Structure 188 may either be driven by an engaging clutch-type construction mounted on roller 205 ends or directly by the sharpener drive when both pairs of rollers 181 and/or 182 have engaged spike 180 both ends. Also, in the case of spike prismatic bodies, end rollers 207 are mounted on their associated arms so as not to interfere with the free rotation of the prismatic body of the rough spike.

When the spike overall length has been obtained, the two sharpening assemblies are retracted and the spike has been given its final shape and is ready for insertion in the structure then being wound. First, it must be unloaded from spool 200. Thus, after the sharpening assembly has been pulled away from the spike ends, spool 200 is caused to rotate another 120-degree angle to position spike 180 in location 209 and the associated arms 206 are actuated to free the finished spike. The latter then falls in one of receiving grooves 211 of conveying belt 212 in location 210. A completed shaped spike 180*, made of fiber segments bonded by cured resin is then conveyed away for subsequent handling.

This handling involves either insertion of spikes 180* in the structure at this stage or the carbonization and densification of the spike resin matrix, depending on the fabrication process which is deemed to provide the best bonding strength between the fiber segments in a spike and/or between spikes and strands. This is discussed further in the next section. For the purpose of the description of the spike insertion embodiments, the nature of the spike matrix material is immaterial and is not mentioned further in this section.

Two basic alternate embodiments of spike insertion system are described in relation to the present invention. The first involves a hammer-type of spike driver, treating the spike as a nail, and the second uses a gas gun to propel spikes onto the structure for impacting it with sufficient force to become embedded in it. In the last instance, a lodging cavity may be pre-punched in the structure at the location on the structure where the impact is to take place. The punching tool may be actuated in a manner similar to that which is used to actuate the hammer. The hammer drive embodiment is described first. It is presented in FIG. 34 in which hammer head 218 guided in body 219 is positioned between spike 220 to be driven in structure 221 and impact stem 222 actuated by hammer actuator 223. Body 219 and hammer actuator 223 are rigidly connected by structure 224 and move as one assembly. In FIG. 34, an electric hammer actuator is represented and functions as a vibrator, though an actuator driven by compressed air could just as well be used. Actuator 223 is articulated on support structure 225 by axle 226 in a manner such that the whole hammer assembly is enabled to both move in the direction of arrow f and rotate according to arrow f'. In addition, a stepping motor 227 mounted onto hammer actuator 223 by means of structure 228 drives a gear 229 engaging gear 230 affixed to body 219, so as to enable the latter to rotate with respect to fixed structure 225. This degree of freedom is needed for driving prismatic spikes which require angular positioning with respect to a fixed set of reference coordinates, as discussed in the next section. The bottom part of hammer head 218 is shaped to fit either cylindrical or prismatic spikes, both having the same conically shaped pointed ends. Removable spike-guiding insert 231 housed in body 219 and held by locking screw 232 enables the apparatus operator to change insert 231 to fit spikes of either different size section-wise or different cross-section shapes, i.e. cylindrical or prismatic. Insert 231 and its locking screw 232 are indicated in phantom lines in order to show that they are not needed if spikes with identical cross-sections only are used. It will be clear to readers familiar with the art that spikes of different sizes and shapes can be driven at any angle and orientation with respect to structure 221 to be impacted, and to any depth therein.

The punching tool 235 of FIG. 35 is driven in a manner similar to that which was just described for spike 220 of FIG. 34. Punching tool guiding body 236 can thus be visualized as an extension of body 219 previously described. However, a heating element 237 is added and is mounted on body 236 at its lower end so as to heat punching tool 235, thus facilitating its penetration in structure 221 which has an uncured resin matrix easy to plasticize locally. Spike-lodging cavity 238 is made slightly smaller than the spike size so that the spike later driven in cavity 238 will become firmly embedded in the structure being wound. It is believed that such pre-punching operation will also facilitate spike driving by a hammer and thus may prove of general use.

Another advantageous hammering operation should now be mentioned and is referred to as tamping. It is described in FIG. 22 and 23 and is used for compacting freshly laid strands such as 85 of FIG. 11 between the spikes so as to minimize void numbers and sizes both between strands and spikes, and strands themselves. Again, the hammer assembly described in FIG. 34 may be used for actuating stem 240 attached to tamper 241 that is positioned and guided between rows of spikes such as 220. Several such tamping stations are located about the structure external surface and become activated whenever the structure rotation stops.

The angle and shape of the pointed ends of the spikes were earlier mentioned as being selectable in a programmed manner by adjusting the fiber segment length distribution and/or the shape of shaving rollers 181 and 182 of FIG. 28. The description given of the manner by which spikes are driven in the structure emphasizes the importance of the shape given to the spike ends. Three frequency or density distribution curves and corresponding basic spike end shapes are presented in FIG. 21 graphs where the percentage of fiber segments of a given length in a spike is plotted as a function of segment length. The correspondence between approximate basic curves and end shapes is graphically illustrated for all three basic types—I, II and III. The conical shape which corresponds to curve II is the base shape adopted in the graphic descriptions shown in the drawings but should not be construed as being that which will always yield the most advantageous strength and fabricability characteristics.

FIG. 36–43 present drawings and schematics of a gas gun system used for driving spikes into a structure in the process of being wound. FIG. 36 schematically depicts the overall gas gun system which includes a high pressure gas supply (not shown) connected to duct 250 equipped with a fixed-size restricting orifice 251 exposed to gas pressure P on its upstream side. Gas pressure P' at multi-way connection 252 thus becomes function of the total gas discharge area offered by all variable-size restricting orifices located at the end of each one of three gas ducts 253, 254 and 255. These restricting orifices are adjusted or controlled by means and for reasons which will become clear later on. Duct 255 brings gas at pressure P' to pressure chamber 256 from which the gas is allowed to escape through gap 257 formed by lip 258 and cooperating diaphragm 258' controlled by solenoid 259. When diaphragm 258' is caused to move toward the right, gas stored in chamber 256 is permitted to rush through exit duct 260 which opens into a breech 261 of a revolving loading barrel 262, both shown in detail in FIG. 40 and 41 and barrel 262 is diagrammatically indicated in FIG. 36, but fits in space indicated as "262".

A spike 263 present in the breech is then propelled through gun barrel 264 at a velocity V when it reaches muzzle 265 of the barrel. The gun muzzle is fitted with a gas deflector 266 permitted to slide on barrel 264 so that when some of the gas pushing spike 263 out of the muzzle hits the deflector, a signal may be generated by means of index arm 267 cooperating with contact 268 that activates spike-discharge detection switch 269. If by error no spike was present in the breech or gas is not admitted in the breech as programmed, the recoil action of deflector 266 does not take place and a misfire is recorded so that appropriate further correcting steps can be taken.

Gas duct line 253 connects (line b—b) with pilot valve 270 that controls revolving barrel 262 motion. To that effect, several operational steps are taken during each spike loading operation: (1) barrel 262 must be unlocked, (2) barrel 262 must be rotated, (3) a spike must be admitted in the breech formed by barrel 262 in cooperation with the structure holding and guiding it, (4) barrel 262 must be locked, (5) the spike must be ejected, and (6) barrel 262 must again be unlocked. The elements needed for locking-unlocking barrel 262, engaging and moving it and detecting its angular position are diagrammatically shown in FIG. 36 and in FIG. 37 in more details on some critical elements.

Gas at pressure P' is supplied to pilot valve 270 actuated by solenoid 271 controlled by signals generated by a Central Processing Unit (CPU) which regulates and controls both strand winding and spike insertion operations during the reinforced structure construction, as described later on. Depending on the signal received by solenoid 271, gas is admitted in cylinder 272 of gas actuator 273 on either one of two sides of piston 274 sliding inside cylinder 272. The end of cylinder 272 is articulated by socket-ball joint 275 mounted on apparatus structure 276 so as to provide the degrees of freedom indicated by arrow-set f shown in perspective and corresponding to arrows f' and f''. Finger 277 located at the end of linkage bar 278 engages or disengages barrel 262 according to arrow f'' and causes barrel 262 rotation when bar 278 moves in arrow f' direction when finger 277 is engaged. Thus, the coordination of these two motion modes results in barrel engagement first, then its rotation and finally its disengagement.

As described, piston 274 actuates barrel 262 during its rotation. A second actuation system is needed to provide the concomitant finger-barrel engaging/disengaging operation. This is accomplished by means of actuating bellows 280 and opposing spring 281 which are arranged to actuate linkage arm 278 in arrow f'' directions depending on the level of the gas pressure admitted in bellows 280 at point b. Engaging spool 282 located between bellows 280 and spring 281 rides in curved slot 283 shaped to allow the slight oscillating motion that barrel 262 step rotation demands. FIG. 38 shows a plan view of linkage arm 278 so as to depict the shape of slot 283. Two gas reservoirs 284 and 285 connected to the two spaces formed between piston 274 and cylinder 272 ends are equipped with restricting orifices 286 and 287 respectively, so as to slow down the response of piston 274 to signals sent by pilot valve 270, so that the step rotation of barrel 262 is rendered smooth and gradual. Letters "a" indicate venting either to the atmosphere or a low pressure gas sink. Letters "b" indicate connections between cooperating ports of the pilot valve and inlets to gas actuators. The operation of the pilot valve lands and cooperating ports is well known to readers familiar with the art and does not justify further elaborating. The graphs of FIG. 39 indicate how the gas pressure varies in various actuators as a function of time and are used to explain the gas gun operation in a later section. The gas gun itself may now be described.

FIG. 40 and 41 show details of the gas gun not yet mentioned and pertaining mostly to spike loading and firing mechanisms. A word of caution is required here to clarify the section line arrangements that relate the two figures to each other. Section line 40(L)—40(L) of FIG. 41 pertains to the gun discharge barrel assembly illustrated on the left side of vertical phantom line 40' of FIG. 40, whereas the spike loading barrel and breech assembly is shown between vertical phantom lines 40' and 40'' of FIG. 40 that corresponds to section line 40(R)—40(R) of FIG. 41. The combination of two such different sections along a well defined separation plane such as a plane perpendicular to FIG. 40 plane and passing through line 40' (or 40'') permits the presentation of two vital interconnected system assemblies of the gas gun on one single sectional view so as to facilitate the readers' understanding of the overall assembly.

In FIG. 40, spike-discharge detecting switch 269 is positioned below barrel 264, although it can be located almost anywhere around barrel 264, except for an angular space where a proximity-measuring must be located, as stated and shown later. The breech formation is described first. As earlier mentioned, it is formed through the mutual cooperation of barrel 262 and of surrounding structure 300 supporting and guiding it. Structure 300 is held by column 301 attached to the overall fabrication system structure. Barrel 262 is centered in structure 300 by two trunnions 302 and 303, it can be locked by finger 277 when the latter is caused to enter hole 304 and engage bores such as 305, in the manner previously described. A small orifice 306 allows gas to escape very slowly from chamber 256 and then through holes such as 307 between the face of barrel 262 and associated facing cheek of structure 300 so as to prevent gas back pressure from building up if a minute leak occurs through gap 258.

FIG. 41 drawing illustrates the breech spike-feeding system, the means for forming the breech and the manner by which spikes are positioned inside breech 261. A guiding structure extension 308 channels a plurality of spikes such as 309 tack-bound to supporting tape 310 sliding on light cover structure 311. A sharp edge bar 312 breaks off the light tack bond attaching spikes 309 to tape 310. The tacking process could be performed by a plurality of narrow strips of adhesive coating disposed lengthwise on the bottom face of tape 311. Such tacking adhesive may thus be used to pick up the completed spikes carried out of the end shaping station presented in FIG. 33 by conveying belt 212, so as to place spike-loaded tape 310 onto guiding structure 308. The spike-free unloaded tape 310' is then taken up by spool 313 for discarding or further re-use. Spool 313 is driven by motor 314 equipped with a slip-friction drive (not shown and mentioned as possible example) so that free spikes are always pushed down in spike-feeding channel 315, into the breech loading mechanism.

This mechanism preferred embodiment used as example here comprises a plurality of semi-circular grooves 316 located on the outer cylindrical surface of barrel 262 and extending between both of its two faces such as 317, so as to form the first half of breech 261. Recess 318 extending between structure 300 cheek inner faces is provided so as to: (1) allow spikes to travel from the bottom end of channel 315 to breech 261, and (2) house especially shaped flap 319 forming the second half of breech 261 automatically. To that effect, leaf spring 320 constantly attempts to maintain flap 319 in its extended position inwardly unless a spike is being forced to travel in arrow f direction while being trapped in a groove 316 destined to become the breech next half. Flap 319 extends the length of cooperating grooves 316. Flap 319 is shown in solid lines in FIG. 41 compressing spring 320 in its retracted or folded position and it is shown in dotted line in a protruding inwardly extended position when forming the complement of the breech cylindrical internal surface. The space above the breech and barrel 264 is occupied by a proximity sensing device 321 and its associated sighting tube 322 shown in solid lines in FIG. 41 and in phantom lines in FIG. 40 because it is not seen according to section line 40(L)—40(L) of FIG. 41, but seen left of section line 41—41 in FIG. 40, however. This sensing device and its function are described and discussed later in details. The gas pressure action on flap 319 is set to be smaller than the force exerted thereon by spring 320 which, in turn, is small enough to accommodate the sliding of a spike against its inner surface. Flap 319 is articulated in structure 300 as shown in the drawing in a manner that prevents jamming and minimizes friction. Also, two details should be mentioned at this juncture: (1) the swinging end of flap 319 actually forms only one quarter of the breech surface, the other quarter being cooperatively formed by structure 300, so as to retain flap 319 within a confining but guiding boundary that cooperates with its articulation to provide only one swinging degree of freedom, and (2) the rounded heel formed by the intersection of the quarter circle mentioned above and the flap inner surface serves as a stop by resting against barrel 262 outer surface when no spike is present therebetween.

To complete the gas gun description, finally two detail drawings shown in FIG. 42 and 43 should be examined in conjunction with FIG. 41 drawing where a dotted-line element 325 is shown in the right upper corner thereof. Twin elements 325 and 325' are depicted in FIG. 43 and interact with the outer cylindrical surface of barrel 262 as indicated in FIG. 42 and 43. Elements 325 and 325' are used to lock barrel 262 in a fixed position more accurately than finger 277 could. To that effect, cones 326 and 326' are actuated by solenoid 327 and 327' respectively to engage matching receiving conical cavities 328 and 328' located on barrel 262 outer surface. A plurality of shallow flat cavities such as 329 are located between grooves 316 and are vented by holes such as 330 into bores 305. One hole 331 supplied with compressed gas by duct 332 channels this gas into cavity 329. Hole 331 is shown in phantom lines in FIG. 43 for only indicating how it relates to corresponding flat protrusion 333 rising from the bottom of cavity 329, although located opposite to element 325 in FIG. 41. The registering cooperation of hole 331 opening into cavity 329 with the flat top surface of protrusion 333 acts as a shutting valve on a compressed gas servo-flow used to signal the closing of hole 331, hence the position of barrel 262. When such signal is given, solenoids 327 and 327' are activated, which causes the locking of barrel 262 and permits finger 277 engagement. Pneumatic servo-systems of this type are well known in the art and no further elaboration thereon is needed here. A fixed-size restricting orifice is located upstream of hole 333, but needs not be 10 shown, being part of such well-known servo system. When hole 331 is not shut by protrusion 333, gas must be free to escape and holes 330 provide such escape route, so as to avoid back pressure build-up. In FIG. 42, the cylindrical outer surface 334 of barrel 262 serves a dual purpose: (1) to enclose cavity 329, and (2) to act as rest surface for the knee of flap 319. This completes the description of the various gas gun mechanisms and of their operation, but the manner by which they relate temporally is discussed in the next section in conjunction with the overall system operation and fabrication step control and coordination by its CPU.

The process of winding filaments, strands and/or tapes onto a mandrel or form is well known and is described in my cited U.S. Pat. Ser. No. 3,577,294 in enough details. This needs not be reiterated here and emphasis is placed only on two aspects specific to the application of the present invention: (1) the winding of strands between protruding spikes, and (2) the insertion of these spikes in a structure in the process of being wound. In order to guide the reader and facilitate his (her) understanding of these two specificities, some background information should first be given at this point. The size of the spikes is typically between 1/16th and ⅛ of an inch for the diameter, or somewhat larger depending on the article size, and ⅜ and 158 of an inch for the total length, or somewhat larger for a large and very thick article or the spike location in the article, e.g. thickness-wise. The diameters of strands of interest could vary from 0.020 to 0.050 inch typically. The separation distance between spikes could typically vary between three to five times a spike diameter, again depending upon the spike location and the size and thickness of the article, and its contemplated use. The transversal rigidity of the strands is minimal, specially when the partially-cured resin binding the individual filaments forming the strands is heated. Strands are then amenable to section-shaping by side tamping for examples earlier mentioned. Thus, typically, two or three strands can be programmed to be wound between two contiguous spikes, as shown in FIG. 23 or 34.

With the advances made in the fields of electronics and robotics, it is now state-of-the-art to position objects or tools within 0.001 inch and/or a small fraction of a degree angularly. It is now realistic to envision the possibility of pre-programming both the strand winding and the spike insertion and digitally record such information and store it, because the errors on positioning that mechanical members of the fabrication system could make are one order of magnitude smaller than the diameters of either the spikes or the strands. For that reason, the coordination and synchronization of the two basic operations, strand winding and spike insertion or driving, are deemed possible in a manner such that interference between inserted spikes and strands being wound can be avoided through proper programming. As earlier mentioned, the use of pre-punching the spike lodging in the structure eliminates the need of knowing the exact lateral position of strands which have been laid and tamped tight. With such premises being established, the overall fabrication system of the present invention preferred embodiment can now be described.

FIG. 44 schematically and diagrammatically represents how the two operations can be simultaneously performed. The fabrication of the spikes is assumed to take place according to the description already presented, on a side situs, so that completed spikes are timely delivered by tape 310 of FIG. 41 to gas gun 350 of FIG. 44. The integrated strand-winding/spike-driving system thus comprises three separate identifiable fabrication stations, in addition to the spike fabrication station just described: a first station represented by table 351, a second station represented by mandrel or form 352 and a third station represented by table 353. The strand winding results from the coordinated actions of members located in the first station and of the rotation of mandrel 352 which, with its driving mechanism and a control system therefor, constitutes the second station.

The second station is described first. Mandrel 352 is mounted on shaft 355 driven by motor and control assembly 356. Digitally, from the beginning of an article fabrication operation, the number of revolutions and fractions thereof made by shaft 355 is recorded and its rotational speed is regulated. Mandrel 352 has the shape and dimensions which the internal surface of the finished article will have, allowing for a extra layer for finish machining upon completion of the carbonization and densification step. In the most general case, because of saddle-shaped double curvatures and of the presence of spikes projecting normally to such surface, it is necessary to orient mandrel 352 axis of rotation with respect to a fixed set of coordinates. Such orientation may take place with respect to a fixed reference point C located on the mandrel axis and in the plane of the nozzle insert throat in the present exemplary application. Thus the assembly motor-356/shaft-355 is enabled to assume any angular position about point C in the plane of FIG. 44 (assumed to be horizontal hereinafter by convention) in the double direction indicated by arrows f by means of motor drive 358 mounted on fixed reference table 359 partially outlined in phantom lines. If the ideal location of point C varies slightly in double arrow f' directions, provisions may be made for adjusting table 359 accordingly along the nominal direction of mandrel 352 axis, in the manner described later for tables 351 and 353.

To eliminate the influence of any angle made by strand 360 in relation to a horizontal plane passing through point 0 defined as the tangency point between any strand being wound and the surface of the uncompleted structure already wound, provisions are made elsewhere for always maintaining strands 360 horizontal. An approach based on adjusting the height of the point where from a strand comes is deemed easier than adjusting the height of the mandrel assembly. The rotation of mandrel 352 causes strand 360 to approach point 0 at a variable velocity V', which would allow the angular velocity of the mandrel to remain constant. This might be simpler and easier to achieve than varying the mandrel angular velocity to maintain V' constant (discussed further later). If the strand winding takes place between stations 361 and 362, an already wound strand assumes the positions shown by curve 363 from a point 0' to present point 0 along and about an intermediate wound surface 364, represented as being located halfway between the mandrel surface 365 and the final structure external surface 366. As a result of the changes in direction of the winding which occur at each end station 361 and 362, the path followed by one single wound strand intersects itself at points 367, 368 and 369 corresponding to three revolutions of mandrel 352. The distance $\Delta$ between two parallel paths serves to indicate how and why the winding already done and the winding still to be done can both be programmed so that the mandrel becomes covered with criss-crossing wound strands, in a manner such that the final structure thickness varies as a function of: (1) the diameter thereof at any given station, and (2) the distance between such station and point C reference station.

The winding angle $\theta$ made by a wound strand at any point 0" is defined by the angle between tangent T at point 0" to the strand path and a plane perpendicular to the mandrel axis which determines line N at its intersection with a horizontal plane passing through point 0". A reader familiar with the art will understand how varying angle $\theta$ along the strand path, i.e. the winding angle at free-strand/structure contact point 0, according to a programmed schedule will result in the article construction section delineated by contour lines 365 and 366 of FIG. 44. The strand supplying and guiding system mounted on table 351 does just that.

Starting with strand 360 graphically originating at point 0 and following a progression in a direction opposite to velocity V' one finds especially-shaped strand-guiding spool 370 mounted on a gimballed arrangement 371 for enabling strand 360 to continuously orient itself correctly. To that effect, the ring structures 371 of the gimbals rotate freely about their perpendicular axes that meet at point 0* where strand 360 leaves the spool guidance. Spool 370 V-shape groove is thus free to respond angularly to tension $\tau$ imposed on the strand and get oriented. Each gimballed ring structure thus assumes its own angle $\beta$ or $\gamma$. In combination and cooperation, these two angles determine the correct orientation noted above. Gimballed arrangement 371 is mounted on rotatable fork-shaped structure 372 which supports gimbals 371 by means of two trunnions such as 373. Lever 374, in turn, supports motor 375 having a shaft (hidden) onto which structure 372 is affixed by well known means, thus not shown. The other end of lever 374 is mounted on column 376. This column does not rotate but can move vertically so as to adjust the level of spool 370 or that of point 0*. Stepping motor 377, by means of a rack-and-pinion arrangement, not shown here being well known in the art, actuates column 376 during such vertical displacements (Z-direction).

Column-376 supporting structure 378 is mounted on a first movable platform 379 powered by motor 380 and guided by parallel grooves 381 and 382 oriented in the Y direction and located on a second movable platform 383 guided by grooves 384 and 385 oriented in the X direction and located on table 351. Motor 386 powers platform 383 in its motion. It will be obvious to readers familiar with the art that the positions of both platforms relatively to fixed table 351 constantly defines and singularly determines the coordinates of point 0* located at the top of the neck of spool 370 groove over which strand 360 s guided. It will be equally obvious that variations of point 0* coordinates along directions X, Y and Z, assisted by cooperating changes in angles $\beta$ and $\gamma$, can be coordinated in a manner that always yields an angular direction of line 0—0* that results in the wanted value of angle $\theta$. The coordination of the two directional displacements of point 0 (in the Y- and Z-directions) and of the three directional displacements of point 0* (in the X-, Y- and Z-directions) is accomplished as discussed in the next section. Means for both determining point 0 position and positioning point 0* are state-of-the-art and are readily available in the industry.

Two other essential systems are mounted on table 351: (1) a strand tension adjusting system 387, and (2) a strand resin-impregnating system 388, sequentially located as indicated in FIG. 44. Such systems are well known and need no further elaboration. The strand delivered by suppliers may already or may not yet be impregnated (prepreg). If not, strand impregnation may be needed prior to winding. If it has, the impregnation resin may need softening which can be achieved by heat application or strand wetting with a resin/solvent solution. My U.S. Pat. Ser. No. 3,577,294 describes and discusses these fabrication steps and embodiments therefor. Details of these two systems are not shown in FIG. 44, neither is the strand supplying spool, for simplicity sake.

None of the items mounted on either table 353 or 359 is physically connected to an item mounted on the other table, except intermittently and in non-mechanical ways, i.e. the impact of a spike propelled from the gas gun, the hammering of a spike, the pre-punching of a spike lodging, the tamping of wound strands or the sensing of the proximity of the structure to the gas gun and/or the hammer head. However, tables 353 and tables 359, and the equipment or fabrication system members thereon are very much related in a functional manner. Table 353 supports and guides the gas gun, the pre-punching tool system, the spike-hammering system if used instead of a gas gun and/or wound-strand tamping systems. Readers familiar with the art will understand that other tables similar to table 353 may be located in oblique positions, both above and/or below FIG.-44 horizontal plane in planes parallel to mandrel 352 axis, for supporting wound-strand tamping stations for instance. Because the method used for positioning the equipment present on such additional tables relatively to mandrel 352 and the structure thereon is similar to that of the gas gun, a detailed description of table 353 and of the gas gun positioning system will suffice, as an example of how other tables are operated. Tables obliquely positioned must have their orientation corrected for properly compensating for angle $\phi$ variations of mandrel 352.

Table 353 is equipped with two parallel tracks 391 and 392 on which platform 390 rides. Motor actuator 393 drives a first platform 390 in the X'-direction of the grooves. Platform 390 is also equipped with two parallel grooves 394 and 395 oriented in direction Y' parallel to mandrel 352 axis and perpendicular to the X'-direction. A second platform 396 powered by motor actuator 397 rides along grooves 394 and 395 in a direction thus parallel to mandrel axis 352. The proper combination and coordination of the two orthogonal displacements of platforms 396 and 390 in the X'- and Y'-directions thus enable gas gun 350 to follow the contour of any surface 364 of the article being fabricated and on which a strand 360 is being wound at any given time. The driving of the various platforms by their actuating motors is well known in the art. It can be performed by means of a rack-and-gear arrangement or a threaded power nut engaging a power screw mechanism so that either the nut or the screw rotates. The guiding and supporting of a platform by associated cooperating grooves and/or tracks located on another platform or a table are also well known by readers skilled in the art and need no further elaboration.

Gas gun 350 is mounted on a turret-type of holding structure 400 rotatably mounted on extension 401 of platform 396. The rotation of turret 400 along arrow f direction is accomplished and controlled by means of motor actuator 402 also mounted on platform 396. Thus, in addition to a positioning capability in a rectangular coordinate system, gas gun 350 is given a positioning capability in a polar coordinate system (angle $\theta'$), so as to enable the gun barrel—hence the discharged spike—to be oriented normally to surface 364 at the point where the spike will impact surface 364 when gas gun 350 fires. Gas gun barrel 264 and sighting tube 322 of the proximity sensor 321 move in unison and are relatively positioned angularly so that their centerlines converge slightly and intersect at the spike impact point previously mentioned on surface 364, at a reference distance d* from a reference point located on the gas gun assembly. Such reference point could be turret 400 vertical axis, the end of barrel 264 or the end of sighting tube 322 as is shown in FIG. 44.

The identification of the various signal lines interconnecting the systems and components thereof as above-described, and the use and significance of these signals, are discussed in the next section. So are FIG. 45 graphs which describe the operation of the gas gun temporally in conjunction with the strand winding operation. FIG. 46 to 48 pertain to the driving of a spike by gas gun 350 and describe the nature of the provisions needed to insure a proper positioning of a spike angularly and locationwise. FIG. 46 presents the paths followed by a reference point moving with the gas gun, e.g. tip of barrel 264 or of sighting tube 322, as gas gun 350 shown as the intersection point of X' and Y' coordinate axes must translate and rotate so as to constantly retain its proper firing position. A portion of the nozzle insert structure shown in FIG. 44 and the three corresponding portions of surfaces 365, 364 and 366 are represented. Two separation distances d' and d" between the reference point and these surfaces are assumed and represent extreme practical values of d* of FIG. 44.

If gas gun turret 400 moves in a coordinated fashion along coordinates X' and Y' so as to generally follow mandrel 352 surface according to arrows f and f', the reference point located at a constant distance d' from surface 365 profile must follow curve 405 shown in solid line. If the reference point is kept at a much smaller distance d" from profile 365, the reference point must then follow solid line curve 407. The shape differences between curves 405 and 407 are very substantial. For simplification sake, the vertical axis of rotation of turret 400, hence of gas gun 350, will be assumed to be located on the vertical line passing through the reference point, so that the distance separating sighting tube 322 (or better of barrel 264) end (or even better the spike impact point) from the turret axis in FIG. 44 is nil. A construction accommodation such as this can easily be provided because turret 400 and supporting structure extension 401 can be located well below the horizontal plane passing through mandrel 352 axis of rotation, so as to avoid mechanical interferences. In the case of distance d' and of the nozzle insert outer surface profile 366 combination, the reference point (or the turret axis, with the assumption just made) must follow the path shown by dotted-line curve 406. Curve 406 appears as a transition in shape between the extreme shapes of curves 405 and 407. Such curves, their shapes and their positions relatively to the external surface of a structure being wound have been extensively described so as to facilitate the next section whole-system discussion.

Before the next section discussion, it is worthwhile to mention some conclusions regarding basic requirements pertaining to the way the structure winding station and the spike driving station must physically relate. The examination of and comparison between curves 405, 406 and 407 clearly indicate that: (1) a ratio exists between the values of R (minimum curvature radius of curve 365) and d* below which double loops 0' and 0" cannot exist and loop 0" does not reach curve 365 at point Q, which is unacceptable, (2) any value larger than 1 of ratio R/d* will satisfy such requirement, (3) distance d* must be roughly equal to or larger than at least one spike length to enable the gun muzzle to clear the projecting end of an impacted spike, and (4) the case of curve 365 is the most critical for solid fuel rocket engine nozzle insert applications. The insert maximum thickness t* at the nozzle throat station is the sum of two basic thicknesses t1 and t2. Thickness t1 corresponds to the amount of insert material which is expected to ablate and/or erode away. This portion of the insert structure thus benefits most from the presence of spike reinforcing. This is also the insert portion where the curvature radii of surface 364 profiles are the smallest, hence the selection made of this type of structure as a typical example of an application of the present invention.

FIG. 47 and 48 graphically depict the case of spike driving by a gas gun while the structure is still rotating in instances when spike lodging pre-punching is not used. Readers skilled in the art know that the angular velocity ω of the structure is low and that the corresponding linear speed V' of the structure external surface is a small fraction of the muzzle velocity which the spike is capable of reaching. However, as the spike penetrates structure layer 410 by an amount h from impact point Q' inwardly, the spike decelerates very quickly at a time when it is not yet firmly embedded the full depth of layer h. During its deceleration period in the radial direction, the spike must also accelerates in the direction of the motion of the external surface of the structure. Spike S is thus subjected to an inertial reaction force F which tends to tilt spike S between positions S and S' by an angle α'. Thus, if gas gun 350 is oriented to give a lead angle α' with respect to a direction normal to layer 410 surface to spike S, the embedded spike S' will end up orientated normally to layer 410 external surface. For practical values of V', structure uncured composite material hardness, spike construction and dimensions, spike end shape and angle, gas gun muzzle velocity and degree of tamping of wound strands, experimental data will help determine an approximate representative value of α'. It is estimated that α' will be a few degrees, thus either negligible or easily corrected for by raising gas gun 350 muzzle by that angular amount, considering the winding direction shown in FIG. 44. This approach eliminates frequent stoppings and startings of mandrel 352 in its rotation, which may represent a considerable time savings and less wear of the equipment.

In FIG. 48, another consideration is graphically taken into account, i.e. the influence of the structure thickness $t^*$. It is maximum at the nozzle throat where the internal radius R1 is minimum. First, depending on whether strand 360 velocity is kept constant or the mandrel angular velocity ω is kept constant, the linear velocity of the structure external surface at the throat station either remains constant or varies as the structure thickness builds up. Arguments can be made either way as to which is the most advantageous fabrication approach. However, the handling of the strand resin-impregnation, the tamping of wound strands, the control of the tension exerted on the strand and the accommodation of the presence of projecting spikes may prove easier to achieve if the strand winding velocity V' is kept constant while the angular velocity ω of the mandrel is caused to adjust thereto. This approach requires ω to become adjusted in a programmed manner as a function of the structure external surface radius $R^*$ that varies with both t1 and the distance between points 0 and C of FIG. 44 if point C is chosen as the origin of both Y and Y' ordinates of the reference systems, X and X' representing abscissa. In the following description, it is assumed that the strand winding velocity V' is kept constant and that distances $d^*$ and $d^{*'}$ remain the same so as to facilitate the distance-measuring task of proximity sensing device 321.

Thus impact point Q" becomes Q' as the structure radius increases from R1 to R2. Distance δ between the axes of sighting tube 322 and of barrel 264 at distance $d^*$ of the structure external surface remains fixed and constant for simplicity sake. With such simplifying assumptions, readers skilled in the art will understand why and how angle α' previously defined can remain constant as the structure thickness increases, but why and how angle $α^*$ between the direction of the normal to the surface at point Q" and barrel 264 axis will vary in such instance. Another point point worth mentioning is that the axes of barrel 264 (or 264') and sighting tube 322 (or 322') may be positioned in the same horizontal plane (FIG. 44 case) or in the same vertical plane (FIG. 40 and 48 cases), or in any oblique plane in-between. The converging of the two axes at the point of spike impact and the rotation of turret 400 eliminate such problems. Thus ideally, the discussion of the next section is based on the following system construction: (1) distance $d^*$ equals spike length L, (2) the axes of the gas gun barrel and of the sighting tube converge at distance $d^*$ on the structure external surface, (3) the gas gun barrel axis is enabled to form angle α' with the plane passing by mandrel 352 axis and spike impact point Q' (sighting point for distance measurement purpose), (4) the gas gun turret axis of rotation (orthogonal to mandrel 352 axis) passes through point Q', and (5) mandrel 352 angular speed ω is variable and adjustable so as to maintain V' (strand winding speed) quasi-constant. A few general points of interest should now be noted: (1) the plane of FIG. 44 that was assumed and indicated as being horizontal could just as well be vertical or oblique provided that the planes of tables 351 and 353 assume identical orientations, (2) the actual planes of these tables are located at a distance from the parallel plane which passes through mandrel 352 axis, so as to provide space for installing the fabrication system elements mounted thereon as previously described, and (3) the same remark applies to obliquely-oriented tables that support other fabrication elements such as strand tamping systems.

FIG. 49 presents a combination of flow and block diagram for illustrating the manner in which fabrication elements and steps interconnect and sequentially mutually relate. All spike fabrication elements add steps have previously been described. The spike insertion (or driving) elements and steps have also been described hereinabove. So have the strand winding apparatus and steps. The coordination, synchronization, control and adjusting of such steps are discussed in the next section. They are discussed in a reference framework based on the overall system integrated construction assumptions already identified. These assumptions are made only for the sake of convenience and do not represent limitations in scope neither of the method and apparatus of the present invention nor of their applications to other article shapes and/or end uses. The combination of these assumptions in one embodiment example should not be construed to be limitative either.

DISCUSSION AND OPERATION

This section is divided into five sub-sections, one for each main subject treated herein, as follows:(1) matrix resin systems, (2) spike fabrication and insertion, (3) strand processing and winding, (4) overall fabrication system integration and control, and (5) concluding remarks.

MATRIX RESIN SYSTEM DISCUSSION

The following applies equally to types of resins used to bind filaments in strand, fiber segments in spikes and strands to spikes and/or strands together in the wound structure. As earlier mentioned, only graphite or carbon filaments and fibers are considered in the application, although the method and apparatus of the present invention are by no means limited to the exclusive utilization of such materials. Usually, such filaments and fibers are surface treated and coated with a resin that facilitates and strengthens the bonding of these materials to the resin systems used at a later stage to bind filaments and fibers together. The nature of such surface treatments and/or coatings is beyond the scope of the disclosure and well known to readers skilled in the art, thus is not discussed here. However, the selection of resin systems which enter in the fabrication of the spikes, the strands and/or the structure influences both the present invention fabrication process and the structural and thermal properties of the completed article. The resin system nature is thus relevant here.

Depending upon the utilization mode of the completed article, pyrolization—or carbonization—of the resin matrix may or may not be required. Because identical resin systems can be used in either case, typical resin systems mentioned here can be used in both cases. This restriction in selection scope does not indicate or imply that other resin systems cannot be considered for applications which do not require high temperature resistance. But generally, such resin systems are easier to handle and to apply than those that qualify for carbonization and densification, and yield high strength characteristics at elevated temperatures. The resin system discussion is then limited here to well known resin compositions that have been extensively used in the art for many years very satisfactorily. Readers with experience in the use of newer and hopefully better resin systems may substitute such systems, provided that the general guidelines below are followed: (1) the resin must be of a thermoplastic or thermosetting type, so that the degree of plasticity of the resin can be adjusted by regulating its temperature in its partially-cured stage, (2) the resin can pyrolize at elevated temperatures from its cured stage while remaining solid, and (3) the presence of a non-qualifying resin used in some fabricating and processing intermediary steps of the spikes can be eliminated before the structure fabrication completion.

The third guideline applies to the film tape used for retaining fiber segments during the spike fabrication. In all cases where the spike body is cylindrical and the resin film tape can easily be disposed of by standard machining practice, e.g. cases of FIGS. 15, 17, 19, 24, 25, 26, 27 and 31, in addition to tab trimming already mentioned and such as the "centerless shaving" process mentioned in a later sub-section, when the externally-located tape is easily accessible. In the cases of FIG. 6, 14, 16 and 20, a large portion of the tape material becomes embedded inside the spikes and guideline (3) must apply. Being more restrictive, this case is considered in the following part of this discussion.

Resin system candidates can be divided in at least three categories: (1) the carbonizable-binder type having a thermoplastic nature either of the soft or medium pitch variety, (2) the "additional polymers" type such as epoxies, and (3) the "condensation polymers" type such as polybenzimidazole, polyimide and polyquinoxaline resins. Some resins belonging to the second and third categories are also referred to as thermosetting varieties and are known as: phenolic resins, epoxides, furfural-furfuryl alcohol mixtures, etc.... An example of such resin system composition is for instance a mixture by weight of: (1) 25% furfuryl alcohol, (2) 25% furfural, and (3) 50% phenol formaldehyde resin. Many combinations of chemical catalysts and thermal conditions with or without the concomitant application of pressure may be used. The most compatible resin compositions, the most suitable subsequent curing operation and method thereof, and carbonization approaches will be readily apparent to those skilled in the art. Resins of the polyester, epoxide and polyamide types seem likely candidates for film tape materials that enter in the spike fabrication and which must satisfy guideline (3) above.

The above brief description/discussion of the types of suitable resin systems well known and readily available should be sufficient to indicate that specific compositions can be arrived at for the spike and the structure matrices so that each one will optimally perform, either for the bulk of the completed structure or on a microscale, i.e. between spikes and strands, or between adjacent fiber segments in a spike and between contiguous filaments in a strand. Specialists in the applications of such structures and the structural/thermal requirements therefor, in resin system chemistry and processing, etc.... will be able to define and specify the most suitable and appropriate of such possible combinations.

SPIKE FABRICATION AND INSERTION

Readers familiar with the art will know that the external surface of the spikes should be smooth so as to prevent snagging of strand filaments during the strand winding step. Satisfactory operation of the gas gun also depends on a smooth spike surface of its cylindrical body. It was just mentioned above that removal of the resin film tape used in the spike fabrication may also prove advantageous. For these reasons, separately or in combination, a supplementary fabrication step in the production of spikes is of interest. When cylindrically-bodied spikes are used, after the matrix resin has been cured, before the spike ends are shaped, a well-known machining process can be used to shave a thin layer off the spike body. In a manner similar to the centerless grinding process used to ground-finish the external surface of rollers or needles of bearings, grinding may be replaced by the type of shaving which the shaving rollers of FIG. 28, 29 and 30 can perform, but in a manner such that their axes and the spike axis remain parallel. The spike is supported by a roller having also its axis parallel to the other three axes and a diameter smaller than that of the spike. This machining process, well known by machinists, needs no further elaboration. It provides the smoothing out of the spike outer surface and disposes of the resin film layer enveloping the fiber segments.

The case of prismatically-shaped spike bodies obviously cannot be handled by centerless shaving. However, a four-sided shaving process can be used. In such case, continuous rods having a lozenge-shape section can first be formed by the method shown in FIG. 24 and 25, in which semi-circular grooves 159 and 160 are given shapes corresponding to the upper and lower halves of the lozenges 175' or 175" of FIG. 26. The resin-cured rods are then pulled between four shaving rollers arranged in series in two pairs of facing contrarotating rollers opposing the passage of the rod therebetween. Such a machining process is also well known to readers skilled in the art of wood bar or rod cross-section shaping and again needs no further elaboration here.

The manner by which spikes are supplied to gas gun 350 is extensively covered in the previous section. However, if a hammer is used as shown in FIG. 34, means must be provided for enabling spike 220 to be placed in position in hammer body 219 and for retaining hammer head 218 in body 219 bore. This is accomplished by means of vacuum suction tube 450 that connects body 219 bore with a vacuum pump not shown. Hammer-supporting structure 225 is mounted on a movable arm which enables body 219 to be positioned above a completed spike positioned vertically on a "lazy-suzan" type tray arrangement which receives completed spikes and timely place them in position for lifting by body 219. The latter is lowered and vacuum suction is applied, which allows a selected spike to become held in body 219 bore by the suction action. Head 218 is prevented from falling by dowel 451 which engages slot 452. When the free end of spike 220 contacts structure 221, the suction action is discontinued and resumed again when body 219 is lowered over the spike tray to pick up another spike.

Fiber segments used in the spike fabrication are made of expensive materials. It is cost effective to consider spike fabrication methods that minimize the amount of loss of such material which is wasteful. It will be evident to readers skilled in the art that fabricating spikes from rods produced as shown in FIG. 24 and 25 and cut to length, is simpler and less costly than forming individual spikes as shown in FIG. 6, 14, 15, 16, 17, 18, 19, 20, 31 and/or 32. Spikes made from rods may also contain less matrix resin, thus easier to densify and stronger. However, the necessary presence of elongated pointed ends means that end shaping of rod segments automatically causes the loss of a considerable amount of fiber material, estimated at approximately one third of the amount of fiber material contained in a completed spike. This one-third waste of a valuable material should be compared to the additional cost of forming individual spikes and of any structural compensation which must be made to regain a possible loss in structural strength of the finished article structure. Further elaboration on such trade-off is beyond the scope of this disclosure, but ought to be brought to the readers' attention.

Another trade-off of a different nature pertains to the carbonization of the spike matrix material before or after the spike insertion and the driving means used for such insertion. Gas gun driving does not affect the conical surface of the spike end point that projects outside the structure. Thus in that case, a choice between either one of the two spike matrix processing sequences mentioned above can only be based on advantages or disadvantages resulting therefrom in terms of structural characteristics of the completed article structure. Such results are unknown and will remain so until considerable development work has been completed, thus further elaboration is not warranted. However, if spikes are inserted by hammering means, the effects of such hammering on the projecting spike end point may significantly vary according to the spike matrix processing stage. The nature of the mechanical interaction between hammer head 218 and spike 220 of FIG. 34 is of importance. This is discussed first below. Hammer head 218 should not be viewed as a conventional hammer striking the head of a nail. In addition, spike 220 is very rigid and stiff in its longitudinal direction whereas structure 221 is relatively soft and compliant. The spike driving must also be accomplished quickly and preferably by means of a series of rapid blows of small amplitude such as those produced by a vibrator, in order to give more time to strands located in the way of the spike point to move sideways progressively. Because of the large mechanical impedance mismatch existing between the spike composite material and the structure material, at this stage, in the spike 220 penetration direction, it is believed that spike driving by means of sonic vibrations is ideally applicable here. Although this requires good surface contact between the spike pointed end and head 218 matching conical cavity, the shaping of the spike points earlier described should insure that. In such case, stem 222 and hammer head 218 should be combined in one single part onto which the sonic impulses are directly delivered. With this type of "hammering", the spike matrix material can be either cured resin or fully densified strong carbonized material. This will insure that no damage is inflicted on the spike point, but the effect of densified carbonized spike matrix material on the ability of the spike surface to bind properly to the final completed structure matrix is yet unknown. Again development and experimental work will provide such information. Though it is believed that using spikes having a cured resin matrix will eventually result in stronger spike/strand bonds.

Another consideration related to spike driving by hammering is that which FIG. 9 and 10 illustrate. It is believed that most of the final structure strength is provided by the reinforcing fibers and filaments contained in the spikes and the strands respectively. Matrix materials in such composite structures play a vital role as micro-links between fiber segments located on the periphery of a spike and filaments located on the periphery of an adjacent strand. Such micro-links transmit mostly shear loads which requires their bonding surfaces to be as large as possible and the distance between such bonding surfaces to be as small as possible. A large scale integration of all such elemental microlinks contained in a macro-scale volume of the composite results in showing that the composite bulk strength greatly depends on the individual strength of the micro-links. From such consideration alone, readers skilled in the art will intuitively reach the following conclusion: FIG. 10 spike/strand arrangement provides micro-links which are shorter and have larger contact areas than do the micro-links shown in FIG. 9 spike/strand arrangement. The fact that a smaller volume of matrix is enclosed between spikes and strands in FIG. 10 configuration was earlier noted and commented upon, which has an additional strengthening effect. The compounding of these two factors could result in significant differences in strength—tensile as well as modulus of elasticity—between two similar structures, otherwise identical but constructed one with circular spikes and the other with prismatic spikes. Further discussion of this subject is not justified herein for lack of substantiating experimental data and further elaboration on trade-offs is beyond the scope of this disclosure. It should suffice to point out that the present invention provides means for producing either one of two basic spike configurations, and for that matter, means for combining the two by adapting each configuration so as to best meet the local strength requirements of a specific completed structure and/or imposed by its application.

The system minor complexity resulting from the need to orient the section of a prismatic spike can be easily handled as previously mentioned. The emphasis placed thereby on the necessary use of a hammer-type of spike drive and the exclusion of the use of a gas gun must be weighed against the resulting enhancement of structural properties. Readers skilled in the art will be able to draw some meaningful preliminary conclusions from the information disclosed herein, in any event.

It is worthwhile to mention here again that the vertical axes of the turrets carrying any fabricating members or elements physically interacting with the structure external surface should always be positioned to pass through the point on that surface where the physical interaction is taking or is to take place. To be specific, such elements or members include: (1) the gas gun, (2) the spike-hammering device, (3) the strand tamping devices, and (4) the structure-thickness measuring device, which have already been mentioned. Using table 353 and turret 400 as examples, one can see that such turret axis (point 0*) positioning must be constantly located on structure profile curve 364 which moves between curves 365 and 366 as the structure builds up and becomes thicker. Adjustments in point 0* position along direction X' thus must be made to compensate for the structure thickness as a function of Y' and t1 (FIG. 46) for any and all positions of 0* along direction Y'. This is further elaborated on in the subsequent subsections. As earlier mentioned, such arrangement eliminates the need of correcting angle $\theta'$, X' and/or Y' as a function of the distance separating 0* from the point of significance located on surface 364, be it: the scheduled spike impact point, the center point of the location where tamping is scheduled or the point where a thickness measurement is to be made.

STRAND PROCESSING AND WINDING

The word strand herein refers to the bundling of elementary filaments of the reinforcing material in the form of a string or thick thread of roughly circular cross-sections as shown in FIG. 11 for instance. Depending on the pre-impregnation status of the strand with a partially-cured resin, such strand cross-sections may flatten easily and appear as a tape when applied under tension on a hard surface. Even when impregnated with a solid though partially-cured resin, strands may be delivered in the form of tapes and then wound as such. Thus herein, the word strand is not limited to a torsaded filament-arrangement and refers as well to filament-tapes. In either instance, a strand is assumed to be characterizable by a "diameter" dimension ds which could also be the width w of a tape. In FIG. 11, these two dimensions are shown where three strands 85 are replaced by two tapes 85' and 85" (in dotted lines) having a total section equal to that of the three strands located between two adjacent spikes. It should be noted that strands which flatten as shown by tape 85' and 85" sections contribute to the elimination of spaces filled with matrix material, and are structurally advantageous. In the following, such flattening of strands as they are being wound is also considered advantageous and is facilitated.

The strand flattening is facilitated by means of two processing steps or combinations thereof: (1) impregnating non-impregnated strands with resin in liquid state prior to winding or after winding, or (2) softening the impregnating resin of "prepreg" (pre-impregnated) strands by means of heat and/or of a solvent resin solution prior to winding. Additional impregnation of the already wound strands by liquid resin is usually carried out while winding is further proceeding. Such wound-strand impregnating stations are not shown in FIG. 44, the technique being well known by those skilled in the art.

Also well known is the technique of applying heat to the already-wound strand volume so as to advance the resin curing process while maintaining the composite relatively soft, so that the tension applied onto the strand being wound can result in pressure being transmitted inside the structure shell volume. Such internally generated pressure contributes to the elimination of voids created by entrapped air and facilitates the wetting of individual filaments in wound strands. At that fabrication stage, the structure outer layers are thus locally pliable and compliant to the extent that penetration by stiff spikes is not hindered. The purpose of the lengthy discussion above is to establish this major distinction between the method of the present invention and those methods such as weaving in which resin impregnation of the woven structure is performed when the structure form is completed, which results in the resin-free form having very little structural cohesion and thus little cohesive integrity or strength.

The application of the present invention method to the fabrication of solid-fuel rocket engine nozzle inserts is chosen to illustrate the adaptability of this method to variations of shape and thickness automatically according to a programmed schedule. For instance, in FIG. 44, phantom-line curves 460 and 461 indicate where and how a reduction of structure thickness can be obtained by reducing the length L of the 460–461 strand loop. It is evident that structure thickness variations between end stations 361 and 362 can then be obtained by adjusting the number of loops according to any station distance between such station and reference station of point C. In other words, the number of strands traversing any such station, the average diameter of the structure at such station and the mean value of winding angle $\theta$ at such station all contribute to determining the thickness that the completed structure will have at such station. The presence of the spikes increases the structure thickness t* by the ratio $1/(1-Ks)$ if Ks represents the ratio of spike volume to that of the whole completed structure. A ratio Kw of strand volume to total structure volume may also be defined so that the volume ratio Kr of resin matrix is then $[1-(Ks+Kw)]$. At a given station along the structure length, the structure section is composed of spikes, strands and matrix resin which, average-wise, occupy portions of the structure total cross-section in the same ratios as their individual volumes, assuming the same homogeneous consistency throughout the structure as a simplifying premise. R1 and R2 being the radii defined in FIG. 48 and $\theta$ the winding angle as defined in FIG. 44, an equation can easily be derived for expressing a useful relationship between the above-defined parameters as follows: $n \cdot d^2/S = Kw \cdot t^* \cdot (R1+R2) \cdot \sin\theta$ (1), if n represents the number of strands crossing that structure given section.

To satisfy the structure application requirements, Ks, Kw and $\theta$ may have to vary from one structure cross-section to another and possibly also as a function of $t1/t2$, $(t1+t2)$ being equal to t* as shown in FIG. 48. In any event, all such variations are determined by the nozzle insert design. They can be expressed for a given design as a function of Y and $t1/t^*$. Of course, R1 and R2, hence t*, are determined by the design dimensions and can also be expressed as a function of Y. The designer is thus able to determine numerical values for all the parameters above at all stations and for all degrees of structure completion, i.e. values of $t1/t^*$ or relative positions of profile curve 364 with respect to fixed curves 365 and 366. The manner by which such data is applied during the structure fabrication to the strand winding is discussed in the next sub-section.

Two other aspects of strand winding by the present invention method as applied to a nozzle insert fabrication need be noted. First, equation (1) indicates that if angle $\theta$ is constant and all strand loops extend between end stations 361 and 362, Kw and ds remaining also constant, t* varies automatically as the inverse of $(R1+R2)$, or approximately as the inverse of the structure diameter at any station. This is graphically depicted by the way a strand path arranges itself around a mandrel profile as shown in FIG. 44. Second, although such geometric peculiarity may contribute significantly to approximating $t^*$ variations as a function of Y, it is believed that, in the most general case, both $\theta$ and n will need adjusting as a function of Y. If that is so, this can be achieved by programming the variations of both L (length of a loop as earlier defined) and $\theta$ as a function of Y to occur in a scheduled manner and as a function of structure thickness as it builds up during the strand winding. The sequencing of the occurrences of such variations is established by the structure designer in order to obtain composite material properties which vary between stations and with the distance from the structure inner surface so as to best meet the structure application requirements. This design data is numerically computed, programmed and stored for retrieving and use in the scheduling of the sequenced fabrication steps of a complete structure.

During the building up of the structure, measurements are taken at scheduled time intervals of the structure thickness at various stations and angular locations thereof so as to check that the measured thickness values are within the programmed range of acceptable deviations. This is done upon completion of each successive series of fabrication steps, each series being characterized for example by: (1) a given number of mandrel revolutions, (2) a given number of strand back-and-forth loops, and (3) a specified number of spike insertions. The thickness measurement may be performed directly or by comparison, but is done at locations between spikes and where most recently wound strands have already been tamped. Such measurements can be performed by means of a proximity sensing device that does not make contact with the external surface of the structure which might be sticky or tacky, because of the presence of uncured resin. Thickness measurement is direct when the distance between the proximity switch of the proximity sensing device and the mandrel outer surface is directly measured. Thickness measurement is made by comparison when a proximity switch is used to measure a displacement of the proximity sensing device in the X'-direction and such displacement is compared to a nominal programmed value which it should then have according to the programmed fabrication schedule, at that time and in that location. The measured thickness thus differs from a nominal thickness value by the amount of difference between measured displacement and a corresponding displacement programmed nominal value.

The materials entering into the structure construction contain no metal, thus metals located on the structure inner surface or on the mandrel surface may be detected through the structure thickness. If a metallic grid is installed on the mandrel, its closeness to a metal proximity detector can be measured and the thickness of the structure at that location can be calculated as the difference between the distance separating the mandrel surface and the distance separating the proximity switch from the external surface of the structure. Metal proximity detectors have been used extensively for some years in the industry and need no further discussion. However, both thickness measuring approaches require a proximity switch which causes its supporting structure to stop at a fixed distance from an obstacle, i. e. here the presence of the structure outer surface.

Either one of two basic types of signal can be utilized here: (1) optical type, and (2) pneumatic type. In the first type, the diffused reflection by a close surface of the light from an emitter is detected by a receptor. The emitter and the receptor are constructed and positioned relatively to each other and to the surface so that the receptor picks up the diffused light signal only when the optical switch is within a given distance from the surface to detect. The receptor is a photocell and its electric output is amplified and processed by means well known to those skilled in the art. In the second type, a flow of compressed air is allowed to escape to the atmosphere through a small orifice mounted in series with a fixed size restricting orifice to which compressed air is supplied at constant pressure in a manner similar to that illustrated in FIG. 36. When the small discharge orifice comes close to an obstacle, its effective discharge area decreases—as illustrated in FIG. 43 for the end of hole 331—and the pressure between the two orifices increases abruptly. The increase of pressure can either be sensed or used directly to stop the displacement of the discharge orifice supporting structure. In either event, such stop position is recorded and constitutes a displacement or position measurement. The distance separating the surface from the discharge orifice at the time its displacement is stopped varies according to: (1) the discharge orifice size, (2) the size of the restricting orifice located upstream of the discharge orifice, (3) the size of the surface irregularities compared to the discharge orifice diameter, and (4) the pressure level at which the discharge orifice displacement is caused to stop, expressed as a percentage of the compressed air supply pressure. A good measure of such distance is the diameter of a strand. Variations of that distance caused by surface irregularities could only amount to a fraction thereof, e. g. less than half the diameter of a strand or no more than about 0. 020 inch.

Thus, in the most general case, thickness measuring involves three consecutive operations, if physical contacts with the structure are to be avoided: (1) bringing a proximity switch within a known fixed distance from the structure external surface, (2) measuring the amount of displacement of the switch from a reference location, and (3) computing the thickness by comparing such displacement to known coordinate values programmed for the system and stored in the CPU memory. Thickness measurements are scheduled to be taken at programmed locations on the uncompleted structure at scheduled time intervals that preferably coincide with the completion of a phase of strand winding and-/or the start of a spike insertion step. It is also preferable to stop the mandrel rotation during such measurement operation and to perform all measurements at all scheduled locations on the structure outer surface. A three-dimensional contour of the structure outer surface at that time can then be established and compared to the nominal programmed contour which is anticipated at such time. The data processing unit (computer) of the CPU is thus enabled to determine the thickness-building correction steps needed to bring the outer surface contour within the range of acceptable deviating tolerances. Because unwinding of strands is impractical, any such correction must be made by means of supplementary strand loops being added. For this reason, the nominal programmed contours are defined as representing combinations of the smallest thickness values that can be expected, so that any recorded thickness discrepancy corresponds to a lack of thickness build-up and never to an excess thereof. At that time, evaluation of the progress made and of any correction or course of action to be taken can be made by the apparatus operator and entered in the CPU.

While the mandrel is still stopped and after strand winding corrections have been made, the structure outer surface can be tamped, spike-receiving cavities may be punched as applicable and the next bunch of spikes can be inserted. Upon completion of the fabrication steps above, the subsequent strand-winding phase can be started. It is during such mandrel rotation stops that changes can best be executed in the fabrication operation, as programmed. Such changes and combinations thereof may include:(1) the nature of the strands and their impregnation, (2) the winding angle pattern, (3) the spike natures and sizes,(4) the spike distribution density, (5) the nature and amount of impregnating resin being added to the already-wound strands, and/or (6) the location and degree of heating to be applied to the structure.

Readers skilled in the art will readily understand that: (1) spike insertion by a gas gun without spike-lodging pre-punching may be performed while the mandrel rotates, as earlier described, (2) spike hammering devices may be mounted on turrets similar to turret 400 and similarly operated, (3) the latter also applies to punching tool devices, (4) several tables such as 353 and associated turret systems may be distributed around the mandrel as earlier described, (5) other tables such as 351 and associated strand winding stations may also be distributed around the mandrel, and (6) the operations of such additional systems should and could be coordinated and synchronized so as to minimize the structure fabrication time whilst avoiding interferences. Also, it is evident that one CPU system may monitor and control in an identical fashion two or more identical structure manufacturing assemblies. Such readers will also understand why and how precise positioning—linear and/or angular—which numerical processing now provides may be associated with real-time data handling, now state-of-the-art, so as to enable the structure designer to preprogram all individual fabrication steps numerically in the present application, as is widely and extensively done with machine tool numerical programming.

FABRICATION SYSTEM INTEGRATION AND CONTROL

This subject is briefly described and discussed in the previous section and sub-sections. Specific points and details still need be discussed and/or clarified. First, parameters that influence the fabrication process and determine significant structure construction characteristics must be identified and their roles discussed. Then the manner by which such influences and roles may be combined and integrated can be discussed.

Identification of Control Parameters, Roles and Relationships

The total number of parameters is kept to a minimum and they are grouped by operation station, i. e. strand winding station, mandrel rotation station and spike driving station. The first two stations are physically connected by a strand, the first and last stations are not physically linked but must relate operationally and the second and last stations relate both operationally and mechanically though very intermittently, i. e. when a spike impacts the structure. The following is divided into four parts, one for each station and a fourth one for the interactions therebetween.

Strand Winding Station Parameters

A first parameter is determined and controlled in and by that station, the strand tension $\tau$ which indirectly affects the compaction of wound strands, prior to tamping. Theoretically, $\tau$ has no other influence on the winding except for the side loadings that it may cause on spikes, as illustrated by spikes 88 and 89 in FIG. 11 because of improper aligning. Its adjustment is also useful during the formation of a strand end loop, as discussed later below. It is the only independent parameter of this station operation for the purpose of this discussion.

A second parameter, though related to the mandrel rotation, can be considered semi-independent in the context of the winding station operation. It corresponds to the elevation of point 0\* which assures the horizontality of strand 360 and is referred to as Z. Its correct value is assured by the vertical displacements of lever arm 374 which must follow the vertical displacements of point 0 on the structure outer surface.

The third and fourth positioning parameters X and Y are related to each other and to the mandrel rotation. It should be noted here that the X-displacements are not essential, provided that table 351 is located far enough away from table 359. The Y-displacements are essential though and further directly contribute to strand 360 "looping" at the end of each run along the length of mandrel 352 where the velocity dY/dt of gimbals 371 must reverse itself. At such juncture, a transition period must be provided so that the end of a strand loop may properly curve between strand path branches 363 and 363'. This is the time when both $\tau$ and X may be used and concomitantly adjusted in values in a coordinated way so as to facilitate such transitory phase. The end results thereof are that excess strand material accumulates there as equation (1) indicates or as readers familiar with the art will know, as shown by bump M, and that spikes are not needed there and thus should not be present so as to minimize bump M size. The most practical way to cope with this unavoidable situation, while maintaining a sizable tension $\tau$ on the strand, is to provide a recess or groove in the mandrel at both ends as indicated locally by M' in dotted lines. Such accommodating space availability prevents the strand loop ends from sliding or slipping while $\tau$ is maintained. This situation is particularly critical at the other end of the structure where it flares out. The excess structure material so accumulated red along a plane perpendicular to the structure axis and located at point M*.

Spool 370 constantly and continuously adjusts its orientation as previously noted under $\tau$ prompting so as to let winding angle $\theta$ freely adopt its correct programmed instantaneous value at all positions of point 0 between stations 361 and 362 on the structure outer surface. To keep things simple, winding angle $\theta$ considered here is only the projection of a true winding angle on any plane parallel to segment 0-0* and passing by the mandrel axis. Spool 370 shape is that of two conical surfaces forming a V-shaped groove and joined by a fillet having a radius approximately equal to the strand cross-section radius so that point 0\* always remains located at the center of the gimbals. The rotation axes of the gimballed rings 371 are perpendicular and meet at point 0\* by construction. FIG. 44 shows a perspective view of the arrangement, which thus appears distorted.

Depending on the direction in which the strand is being wound, up or down in FIG. 44 plane, and the station of point 0 along the mandrel axis, a total variation in orientation of segment 0-0* could amount to as much as $(2\theta_{max}+\psi)$, where $\theta_{max}$ is the maximum value that $\theta$ may assume and $\psi$ is the total angle variation of a plane which remains tangent to the mandrel surface between stations 361 and 362. This represents a large angular variation in the orientation of spool 370. The automatic adjustments of angles $\beta$ and/or $\gamma$ may not suffice to adequately compensate for such large angular variations in direction of segment 0-0*. The bulk of such compensation is provided by motor 375 which can rotate fork structure 372 by an angle $\Omega$ as large or even larger than the total angular variation defined above. The use, coordination and synchronization of angle $\Omega$ adjusting are particularly critical for the correct formation and positioning of the strand end loops, at which time the linear speed of point 0* must slow down to zero, reverse itself and increase to full speed in the other direction concomitantly with said adjustments of angle $\Omega$, while the mandrel keeps rotating.

Laying and positioning strand 360 on a steeply sloping surface is not easy, the presence of projecting spikes may help or prove to be a hindrance and the amount of tension $\tau$ may need adjusting accordingly, so as to minimize the amount of side loads applied on the spikes. To that effect, rotating the mandrel by an angle $\phi$ as shown in FIG. 44 and earlier noted will help. The consequences of such action are discussed later on.

If mandrel 352 oscillates a scheduled angle $\phi$, the effective winding angle is then $\theta.=\phi+\theta$. $\theta$ now remains to be determined as a function of controllable parameters. Any instantaneous value of $\theta$ is defined by the ratio between the differences $\Delta Y$ of the ordinate values of points 0 and 0*, and the difference $\Delta X$ of the abscissa values of points 0 and 0* With the sign convention for angle $\phi$ indicated in FIG. 44, the projection of distance C-0 (on the ordinate axis being positive and referred to as $\Delta Yo$, and distance $\Delta Xo$ between point C and point 0* path being known and remaining constant, if the part of the structure located between point C and station 361 is only considered for the purpose of the following, as example, $\Delta Y$ and $\Delta X$ may be related to angles $\theta$ and $\phi$ as follows: $\Delta X=\Delta Xo$ Yo. $\tan\phi$, (2) and $\Delta Y=\Delta Yo+Yo.\tan\theta.\tan\phi$ (3), where $\delta Yo$ represents the distance between points C (mandrel 352 oscillation center) and 0 (moving contact point with strand 360). All those parameters are computable, thus known at any given time, although they may all vary as a function of time. The instantaneous value of angle $\theta$ is thus given by the equation below, solvable by iteration:

$$\theta=\tan^{-1}(\Delta Y/\Delta X)=\tan^{-1}[(\Delta Yo+Yo\tan\phi\tan\theta)/(\Delta Xo+\delta Yo\tan\phi)] \quad (4).$$

A similar equation can be derived for the structure portion located between point C and station 362. Necessary sign adjustments in equation (4) will be made by readers familiar with the art to reflect the influence of the structure shape and the fact that point C (center of the minimum mandrel cross-section) is selected here as the ordinate axis origin for convenience reasons.

As was earlier mentioned, because the distance between point 0 and the mandrel axis varies with radius R* (FIG. 48), if strand 360 velocity V' is to remain constant and segment 0-0* is to remain parallel to a known instantaneous direction, two conditions must be maintained: (1)$\omega$. R* =V', and (2) Zo (point 0* elevation) must remain equal to R*. The instantaneous values of R* at all mandrel stations are always known from Y(0*) or instantaneous position of point 0*, hence of point 0, from the scheduled value which R* is programmed to reach after a known number of mandrel revolutions at any given mandrel station, the instantaneous value of angle $\theta$ and the direction in which the winding is proceeding, i. e. upward or downward in FIG. 44. As the fabrication progresses, the thickness of the structure at various stations is measured and discrepancies between actual and programmed thickness values are corrected as earlier mentioned. Such corrections are entered in the CPU memory and all relevant data already stored is accordingly updated.

The interdependent parameters controlling the strand winding and their relationships by direct action on the strand have now been identified. They are: (1) platform 379 (or gimbals 371) displacements in the Y-direction referred to as Y hereafter, (2) gimbals 371 (or spool 370) angular orientation referred to as $\Omega$, (3) gimbals 371 (or spool 370) elevation referred to as Z, and (4-) the direction of the Y-motion of gimbals 371 referred to as d(Y). Platform 379 displacements in the X-direction could be ignored but are mentioned here because of the beneficial role that they could play during transitory adjusting periods when the endlooping of a strand is performed and Y, $\omega,\theta$ and $\tau$ should be programmably adjusted for reasons previously given. All these parameters are shown in block B1 located below table 351. Most corresponding signal lines connecting block B1 to actuating means for adjusting associated parameters are interrupted and such interruptions are identified as a-a, b-b, c-c and so on.

Mandrel Rotation Station Parameters

The functions of this station are simple and pertain only to two angular motions of the mandrel shaft: (1) a rotation of mandrel 352 shaft at a variable and controlled angular velocity $\omega$, which is required for strand winding, and (2) an oscillatory displacement of the mandrel shaft by an angle $\phi$ around an arbitrary axis perpendicular to the mandrel axis, that is not mandatory but facilitates the strand winding in some portions of the mandrel surface, for some structure shapes. One method of structure thickness measurement requires that the location of mandrel 352 outer surface at a given station be passively indicated, only to provide a reference position for the thickness measuring means.

Block B2 located below mandrel 352 schematically represents the two actuating means or motors 356 and 358 used for providing $\omega$ and $\phi$, and their temporal variations. The controlled and adjusted values that $\omega$ and $\phi$ must maintain at any given time are provided by the magnitude of signals received by motors 356 and 358, and generated by the CPU. This matter is further elaborated on later.

Spike Driving Station Parameters

The operations of spike driving, structure thickness measuring and strand tamping are all performed by elements or members positioned on and actuated from tables similar to table 353. Thus table 353 of FIG. 44 is used as example here. Two basic ways of different approaches may be used for driving spikes with a gas gun, impacting the structure with the spike while the structure is rotating or inserting the spike when the structure is not rotating, in which case pre-punching a lodging for the spike in the structure is practical and possibly advantageous. Because the operation of driving a spike into a rotating structure represents the most complex system, it is used as example for discussing operational parameters pertaining to table 353 and its gas gun.

The gas gun operation in terms of spike delivery to the gas gun, spike positioning in the aiming barrel and spike expulsion therefrom is described in the preceding section. The temporal elements of such operation as illustrated by the graphs of FIG. 39 and 45 need additional discussion. FIG. 39 curves indicate how various gas pressure levels of interest roughly vary as a function of time during one spike firing cycle of $\delta T$ duration. FIG. 45 graphs indicate very approximately how various operational steps of key members of the gas gun actuation temporally relate.

FIG. 39 shows the variations of three pressure levels from a time origin 0 to time $\delta T$ that represents the end of a spike figuring cycle. Curve ① corresponds to the gas pressure theoretically available chamber 256 of FIG. 36 if no gas leakage flow is assumed through orifice 306 of FIG. 41. Curve ② corresponds to the gas pressure actually existing in chamber 256 as various variable-size controlling restricting orifices become closed before diaphragm 258' is caused to open by means of solenoid 259. The gas pressure in breech 261 is close to atmospheric pressure before spike 263 is positioned in the breech then it rises to a level ⑤ lower than pressure level band ④ below which a spike cannot be pushed through barrel 264. W solenoid 259 is activated, diaphragm 258' is pulled off lip 258 and gap 257 opens and the gas pressure in breech 261 rises (curve ③)to level ⑥, whereas the gas pressure in chamber 256 decreases concomitantly. Spike 263 is then accelerated to a muzzle velocity V trough barrel 264 by this burst of gas supply mostly provided by pressurized gas accumulated in chamber 256. At time T', solenoid 259 is deactivated, gap 257 closes and the gas pressure in chamber 256 rises to a nominal level. The spike firing cycle is then completed.

The graphs of FIG. 45 indicate how nine parameters of interest typically vary during one complete cycle $\Delta T$ of gas gun turret positioning for and during the firing (driving) of a spike into the structure. The turret orientation $\theta'$ is assumed to start from a rest position, to reach a spike-firing orientation $\theta'$, to remain there most of $\Delta T$, which encompasses $\delta T$, and then to return 0 to its rest position 0, as the first $\theta'$ graph indicates. The second graph Xd shows the travel of gas deflector 266 between its rest position 0 and its maximum displacement x near the end of the firing cycle. During its displacement 0-x (point ⓐ displacement x*), deflector 266 causes sensor 269 to genera a signal indicating that a spike was fired. Graph Vs depicts the spike velocity variation between 0 and V during its travel in barrel 264. Graph B1 indicates the time during which barrel 262 remains locked by means of shaded area ⓑ which lasts slightly longer than the spike-firing period. Graph Arm refers to the return movement of linkage arm 278 which causes barrel 262 to revolve according to graph Br curves. Shaded area ⓒ shows when arm 278 becomes disengaged after barrel 262 is lock w shaded area ⓓ indicates how much time is available to arm 278 to re-engage barrel 262, in preparation for the next barrel revolving cycle. Branches ⓔ of the Br curve represent different speeds at which barrel 26 may be caused to revolve, whereas branches ⓕ represent the arm/barrel re-engagement mentioned above.

Graph P is easily recognizable because it corresponds to curve ① FIG. 39. Branches g and ⓗ of the curve are shown in dotted lines because they represent only an average level of a fluctuating gas pressure. These fluctuations are caused by the opening and closing of various control restricting orifices and of pilot valve 270. The relative sizes of these orifices and of pilot valve 270 ports determine the amplitudes (as identified by levels 1 to 8 of FIG. 39) of such pressure fluctuations between atmospheric pressure (atm. ) and the supply 1. pressure P (max). Branch ⓘ indicates only that gas pressure in chamber 256 may start rising earlier depending on the gas flow through restricting orifice 251 (FIG. 36) that is used for other control functions, which must be completed so as to enable solid line curve ⓙ to rise to the maximum gas pressure level available, so that the chamber 256 becomes fully pressurized prior to the initiation of the spike-firing cycle. Shaded area ⓚ represents in a pressure-level equivalent manner force F of spring that must be overcome by pressurized bellows 280 so as to cause finger 277 to engage barrel 262 for causing its revolving actuation.

Graph T1 represents solenoid 325 (FIG. 41 and 43) activation for locking barrel 262 firmly in a spike-firing position. The indications OFF and ON in the graph are explicit enough. A shaded area ⓛ indicates how much longer barrel 262 could remain locked if needed, which would of course elongate area ⓑ of graph B1 toward the right accordingly. Graph Gd represents the opening and closing of gap 257 by means of diaphragm 258'. Shaded areas ⓜ and ⓝ indicate how much longer solenoid 259 could remain activated and how much sooner it could be deactivated so as to close gap 257, respectively. The timing of the activation and deactivation of solenoids 325 and 271 is automatic and performed by means of pressure switch 490 (FIG. 36) connected by line 489 to the gas servo pressure junction 252. The continuity of interrupted electrical connections is indicated by corresponding letter pairs such as c and c. The actuation of the locking system of barrel 262 can also be performed automatically pneumatically by means of locking pin 491 mounted on the free end of bellows 492 connected to gas servo pressure junction 252. This pneumatic locking system is shown in phantom lines because it represents an alternate system which could be substituted for solenoid 325.

From the gas gun operation timing discussed above, it is evident that only: (1) turret 400 needs be positioned and (2) a triggering signal is required to initiate a spike drive cycle which is enabled to complete itself automatically without further outside assistance. The same, although much simpler, type of operation can be used for either spike hammering, spike-lodging prepunching, thickness measuring or wound-strand tamping. In all instances, the mechanisms operating these systems are mounted on turret supports rotating about axes passing by their tangency points with the structure surface where interactions with said surface are to take place, e. g. spike impacting. With such provisions, only three positioning signals and one triggering signal are needed to position and orient each turret so as to enable the system mounted thereon to operate correctly. These signals are identified in FIG. 44 as: (1) the displacement ordinate Y', 2) the displacement abscissa X', (3) the orientation angle $\theta'$, and a time T* when an operational step is initiated. If tilting of a system (e. g. case of a gas gun and a continuously rotating structure) is utilized, a fourth signal $\alpha$ could be added to compensate for the structure tangential speed, if the latter is variable. This would not be the case if the strand velocity V' were kept constant and only small variations of winding angle θ were contemplated. For that reason the α-signal line is shown in phantom line in FIG. 44, indicating that it is not mandatory.

One last parameter or signal is needed, i. e. malfunction parameter μ that corresponds to a GO/NO-GO type of signal as generated by gas gun deflector 266, to alert the CPU that necessary adjustments need be made in the programmed schedule to allow for such malfunction. Such signal flows from turret 400 to block B3 in FIG. 44 and then to the CPU for action thereby. Thus signals controlling the operation parameters of stations such as 353 all flow from the CPU to those stations, except for μ as noted above. In the case of the structure-thickness measuring system, another signal must flow to block B3 and then to the CPU indicating a value of the measured parameter. This signal (d*) is herein treated as a μ-signal would be. The various parameters pertaining to station 353 operation are shown in FIG. 44 with their attendant signal lines and the flow directions of these signals. Station Operating Parameter Integration and Control:

The integration, coordination, synchronization, computation, control and adjustments of the parameters identified above are performed by the CPU illustrated by block B4 in FIG. 44. Most parameters do not require feedback signals. Their instantaneous values are programmed according to a set schedule as a function of time or equivalent time base such as the number of revolutions and fractions thereof which the mandrel has completed. The exact instantaneous angular speed δ of mandrel shaft 355 is thus immaterial and the effects of any error thereof cannot compound. It is only necessary to insure that motor 356 angular speed remains within tolerances but that its exact instantaneous values are detected and used for the exact computation of shaft 355 total angular motion (numbers of revolutions and fractions thereof) from the starting time. Symbol δ used here carries both that connotation and the meaning thereof.

However, the coordination and synchronization of ω, of the displacement Y of platform 379 and X of platform 383, Z of gimbals 371, and of rotation Δ must be assured at all times. If not, adjacent strand loops on the structure external surface being formed, hence later throughout the structure thickness, will gradually become narrower or wider as the case may be, upsetting the scheduled loop pattern of the strand layout. Control steps must be taken to prevent that. Two basic approaches are available: (1) exclusive use of electric stepping motors, and (2) indirect monitoring of the strand loop formation and correcting thereof. Each approach is discussed below.

Stepping motors and their control systems are well known and have been used in the industry extensively. In the present application where high torques, loads, velocities or power levels are not required, the linear or angular magnitude of each motor step can be greatly reduced by means of gear reduction. It is practical to consider linear motions, i. e. X, Z and Y, and angular motions, i. e. ω, Ω and φ, that are programmably scheduled to take place concurrently and rapidly by means of sequenced elementary increments for each motion so that the combined displacement, e. g. the displacement of point 0 on the structure surface and hence angle θ value, so coordinated results in the exact variation wanted of the parameter requiring exact adjustment—angle θ in the example mentioned above. Readers skilled in the art know that the word exact means here "with zero tolerance". Errors in the positioning of any mechanical member due to tolerances then cannot stack up with time, regardless of how many successive steps are sequentially taken. The motor control is effected by discrete impulses numerically (digitally) generated by the CPU according to the preprogrammed schedule earlier mentioned. The coordination and synchronization previously mentioned are programmed by the structure designer and temporally arranged to insure the fabrication step sequence that said pre-programmed schedule mandates. Indirect monitoring of the strand loop forming cannot provide the same degree of exactitude but it is less costly. If it were not for the presence of the projecting spikes, it would be quite acceptable. However, it is not yet known how critical the interferences of strands and spikes might be. The stepping motor approach, by its very essence, insures that such interferences are avoided or minimized (strand micro positioning). The second approach can only insure that errors in strand positioning during one travel forth of gimbals 371 can be corrected during its next travel back (strand macro positioning). This alternate approach for detecting strand looping errors and then correcting their additive effects operates as described and discussed below. At a point u between tables 351 and 352, and half-way between stations 361 and 362, a micro-switch triggers a signal U that indicates when strand 360 passes by, for each back and forth travel of gimbals 371. Signal U is transmitted to the CPU and the total rotation of shaft 355 accomplished since the last preceding signal is determined. The result is compared to the pre-programmed value that it should have. Any difference between these two values is calculated and steps are taken to slightly increase or decrease—depending on the difference sign—the velocity dY/dt of gimbals 371 to compensate for the detected error. The largest errors will be caused during the strand looping at the time of reversal of dY/dt, because four parameters must then be adjusted simultaneously —Ω, Y, X and Z. Thus it is believed that this correcting approach can be greatly improved by adding two other micro-switches u" and u' at the levels of stations 361 and 362 respectively. By means of similar comparisons and difference calculations, the source of errors can be more accurately pinpointed and their effects can be more adequately corrected by applying corrections where the errors originated. Signals U must be corrected to include the effects of φ changes. Even though motor 356 may be of the stepping type, readers skilled in the art will readily understand why and how strand positioning adjusted in such manner may not provide the automatically workable operation of which the first approach is capable, in which a spike can never be urged sideways out of its lodging.

The coordination and synchronization of the operations performed at stations 359 and 353 are much simpler and require only that ω and φ be obtained by means of stepping motors 356 and 358 respectively. The integration of the operations of tamping wound strands, hammering spikes and pre-punching spike lodgings needs not be discussed, for mandrel 352 is then stopped during these operations and angle φ can be equal to zero. Again, this does not apply though if a gas gun is used without spike-lodging pre-punching assistance and spike driving is performed when mandrel 352 rotates. In this most complex case, the influence of angle φ on the spike impact point position and orientation must be taken into account. Turret 400 actual orientation angle $\theta_e$ is then equal to $(\theta' \pm \alpha)$, which is simple enough. The actual values of X' and Y' are adjusted to compensate for the variations in the coordinates of spike impact points programmed for a $\phi=0$ value. The amounts of compensation are calculated in the manner used to derive equations (2) to (4) previously given and are applied to correct such programmed coordinates accordingly.

All the programmed and/or controlled parameters regulating and/or scheduling the structure fabrication steps are indicated in FIG. 44 in blocks B1, B2, B3 and/or B4. Some are also indicated close to the arrow indicating the motion direction or to the elements/members to which they relate. Signal lines are used to indicate both signal connections to such related element and the flow direction of each signal. Letter pairs such as a-a, b-b and so on are used to indicate a signal line continuity, though shown interrupted for graphic simplification sake, from one letter of any pair to the other same letter of that pair.

The integration of the spike fabrication station into the fabrication overall system was described earlier. Furthermore, the spikes can be produced in batches and stored for later use. No temporal relationship is imposed on their interaction, only functional. As previously mentioned, completed spikes can be stored on belts such as 212 of FIG. 33 from which spikes can be picked up by tape 310 of FIG. 41 before it engages the spike-feeding mechanism of the gas gun. If a spike-hammering system is used, the completed spikes can be stored in a tray in a manner such that half of each spike projects out so as to facilitate its prevention by the hammer as previously described. In such case, the motion and in-place positioning of the spike-loaded hammer is well known in the art of automation to readers skilled in the art. No further elaboration is deemed justified here. The integration of all fabrication phases pertaining to the present invention in a general way is now discussed below.

Overall Integration of all Fabrication Steps

The flow diagram of FIG. 49 illustrates how the various fabrication steps and operations described and discussed previously sequentially occur. The diagram also shows those fabrication steps and operations not described and discussed in details, but only mentioned earlier as relevant to the present invention, in the foregoing because they are not part of the present invention. For easy identification of and differentiation between the subject matter of the present invention and relevant background and/ or state-of-the-art information, some blocks of FIG. 49 diagram, each one representing one fabrication step, are grouped in easily recognizable sets represented by rectangles shown in phantom lines. Their pertinence to the subject matter is indicated below.

Set block 500 pertains to the subject of spike fabrication and insertion, thus represents a first portion of the invention. Set block 501 pertains only partially to the invention subject matter to the extent that specific and special strand winding steps must be taken to enable the winding to take place into the spikes and the insertion of spikes into a structure in the process of being formed by means of strand winding. That extent constitutes a second portion of the invention. Set block 502 does not contain subject matter of the present invention and is shown only to indicate relevant fabrication steps that enter into the completion of the strand-wound and spike-reinforced structure, and which relate to the manner in which fabrication steps pertaining to the present invention need be taken so that the requirements created by spike insertion and outward projection are met.

The integration of elementary fabrication steps into fabrication stations that group directly interacting fabrication steps is depicted by blocks 504, 505 and 506. Block 504 represents the CPU and attendant sub-systems. Their structures, functions and operations pertain to the present invention subject matter and constitute a third portion of the invention. The control functions they provide are essential to the operation of block 506 fabrication station, as was previously shown. Block 505 encompasses the subject matter covered by the two left columns of step blocks of set block 500 and as such represents part of the invention first portion. Block 506 encompasses the subject matter covered by the right column of step blocks of set block 500 part of the first portion of the invention and the matter covered by set block 501 which incorporates the second portion of the invention. The scope of the present invention is now well delineated and the manner in which it contributes to and improves the state-of-the-art outlined in my U.S. Pat. No. 3,577,294 is now well defined and delineated. The integration of the various components or stations of the structure fabrication overall system involves more than signal lines interconnecting them. It also involves physical integration because the relative positions of tables 351, 359 and 353 must be fixed and remain so at all times. This is evident because the coordinate systems, i. e. X-Y-Z and X'-Y'-Z', of tables 351 and 353 must both remain fixed with respect to the position of point C which may then be considered the center of the whole apparatus. Rigid physical or structural connections between all three tables are not shown in FIG. 44, but readers skilled in the art will understand that they must exist. This is especially illustrated by the case of micro-switch u, u' and u" supports.

Micro-switch u, and u' and u" for that matter, body 494 is attached to a structure, not shown, connecting tables 351 and 359 so that it can keep a fixed position with respect to either table. Signal U is generated by the interruption of a narrow laser beam by strand 360 so that no physical contact need be made with the passing strand. As earlier described for the proximity switch needed for structure shell thickness measurements, micro-switch assemblies consists of two elements, an emitter and a receptor. Both elements are supported by such rigid connecting structure, for they both must also maintain a fixed relative position. The laser beam has a diameter equal to or even smaller than the diameter of the strand. No-contact signal generation allows the preimpregnation of strand 360 by liquid resin and eliminates the problem of providing for up-and-down variations of strand 360 position, which constantly occurs as the structure thickness grows. Such structural integration is of course contained in block 506.

The central processing unit (CPU—CENTRAL PROC. UNIT) needs no structural connections with the apparatus, only electric connections and can be located any place, and service more than one apparatus. A number of FIG. 44 station assemblies can also share the same spike fabrication station or spike supply source, as the case may be. The CPU includes: (1) input ports for receiving information from the Structure Forming and Reinforcing Station, (2) output ports for sending control signals to the Spike Fabrication Station, (3) a Data Processing section for transducing stored programmed fabrication operational data into control signals for the parameters being controlled or adjusted, (4) a Pre-programmed Input DATA section in which the sequences and magnitudes of all increments of all parameters entering into all the fabrication steps previously identified are inputted by the system operator, and (5) a MEMORY section shared by sections (3) and (4). As earlier described and discussed, the complete sequence of all such increments for all parameters, both temporally and functionally, is determined by the structure designer and reduced numerically in the form of binary data, as is well known in the art of automated machining. Provisions are made for adjustments thereto per instructions stored in the Data Processing section in response to signals such as:(1) spike misfiring ($\mu$), (2) structure thickness measurements, (3) signal U, etc. . . . Provisions for the detection of various apparatus component malfunctions can also be added so as to limit the consequences of an inadvertent or accidental malfunction, as is well known by those skilled in the art. Thus theoretically, the fabrication of one complete structure in which the impregnating resin is only partially cured may be produced without the need of intervention on the part of the operator, provided that strands, impregnating resins, fibers, plastic resin film tapes are continuously supplied.

Fabrication parameters controlled by the CPU are listed under OUTPUT PORTS and signals received from fabrication-step blocks are listed under INPUT PORTS. Blocks 505 and 506 are shown in dotted lines and connected to CPU block 504 by a double solid line without directional arrow because they represent locations where fabrication steps are performed but do not correspond to fabrication steps. Solid single lines with directional arrows represent signal lines, whilst two parallel lines—one solid and the other dotted—correspond to flow lines along which the partially completed structure or components thereof move during the fabrication process. The portion of FIG. 49 flow diagram which includes the CPU (block 504) and the strand winding, mandrel rotating and spike inserting operations (block 506) is illustrated in more details in FIG. 44 in which blocks B1, B2, B3 and B4 with their associated signal lines correspond to a block-diagram graphic representation. In FIG. 49 representation, the signals S and W correspond to the start/stop controls of a spike-driving operation and of a strand-winding (mandrel $\omega$-rotation) operation, respectively.

CONCLUDING REMARKS

The use of the foregoing embodiments and/or combinations of portions thereof results in a method according to the invention having the essential advantage of enabling the fabrication of three-dimensionally reinforced structures of quasi-revolution. The ratio between the relative amount of each directional reinforcement may be adjusted at will. The various degrees of freedom allowed to simultaneous coordinated motions of the three basic systems operating in unison -the strand feeding, the mandrel rotation and orientation, and the spike driving- enable the production of structures having a considerable variety of shapes and/or profiles, including saddle-shaped sections such as those encountered in rocket engine nozzle lining inserts.

The invention features described offer a great degree of flexibility of use, particularly regarding the choice of reinforcing materials and of impregnating resin systems. The structure form produced upon completion of the last construction step has structural integrity and is self-supporting, which facilitates subsequent manufacturing operations such as machining, additional impregnation and matrix material carbonization. The use of the method according to the invention makes it possible to adjust the thickness of various layers of the structure and to vary the nature of the strand and/or spike reinforcements in contiguous layers of specified thicknesses, so as to enable the composite material of each layer to provide the optimum combination of thermal, structural strength and ablative properties that are required of the material during various phases of its useful life.

The use of the method according to the invention enables the structure designer to pre-program such variations in nature and distribution density ratio of the reinforcing strands and spikes in a manner such that these variations can occur gradually, so as to avoid brusque changes of composite characteristics at layer interfaces. Also, the nature of the impregnating resin system can be adjusted for each layer and/or caused to overlap two adjacent layers so as to provide a smoother transition in the change of composite characteristics at specified layer interfaces.

Using the method according to the invention enables the construction of very thick shell structures and, for that matter, solid bodies. In such instances, the ratio of radially directed reinforcements, i. e. spikes, to non-radially directed reinforcements, i. e. strands, can be adjusted to vary according to a pre-set schedule so as to produce a structure optimized to meet the requirements of the body application at all stages of its utilization, when such utilization mandates that material be removed throughout the body lifetime, e. g. material removal by erosion and/or ablation processes. In bodies of revolution, the shell section can be made to vary from very thick to very thin, in which case the ratio of radial reinforcements to non-radial reinforcements can be adjusted to vary along the length of the bodies in the direction of the thickness taper.

The structures or components made of three-dimensionally reinforced composite materials produced by the method according to the invention will satisfy various requirements. More specifically, three types of applications have already been mentioned: (1) nose cone of re-entry vehicles, (2) heat shields for the protection of such vehicles, and (3) inserts of nozzles used for solid fuel rocket engines. The requirements imposed by the environment to which these structures are exposed can be classified in two basic categories: (1) thermal, and (2) structural, i. e. strength and rigidity. Carbon in the form of carbon or graphite, or mixtures thereof, usually meets thermal requirements. Although one thermal advantage of bodies produced by the method according to the invention should be mentioned and is first discussed below.

The carbon material of the reinforcing fibers of the spikes has a thermal conductivity higher than that of the carbonized matrix material. The structural discontinuities presented by the pointed ends of the spikes between the inner and outer surfaces of a completed structure made by the method according to the invention thus offer a higher resistance to heat flow than would a structure of equal thickness and built with the same basic materials. Therefore, the present body will provide a better thermal insulation than would other similar composite materials in which the radial reinforcements are structurally continuous between these two surfaces. Because of the nature of their use, these composite materials have one surface operating a very high temperatures, whereas the other surface is in contact with structural members that must operate at much lower temperatures. Thus the amount of heat transferred by the composite material must usually be kept at the very minimum possible. The present structural composite material does just that, or helps in that regard.

The structural discontinuities along radial reinforcements mentioned above between the inner and outer surfaces could present a disadvantage from the structural strength standpoint, i. e. second category requirements. At first glance, this appears to be particularly true in one very specific instance of one application for which such materials were first developed over two decades ago. Firstly, the requirement must be described and secondly, it will be shown why composite materials fabricated according to the present invention method may perform in a manner superior to that of similar types of materials in which such discontinuities are not present—case of all known construction methods of such three-dimensionally reinforced structures.

The cause for the generation of high tensile loads is created by very strong and short compressive shock waves originating near the outer surface of the structure (nose cone, heat shield), over a depth much shorter than the structure thickness and over a length of time much shorter than the time needed by the shock wave to travel a significant portion of the structure thickness. This compression shock wave propagates inwardly toward the structure inner surface where acoustical impedance mismatch prevents the major portion of the compression shock wave from being transmitted to the underlying supporting metal structure. In which case, the compression shock wave is "reflected back" toward the structure outer surfaces a tension shock wave which causes tension stresses to develop near this inner and later the outer free surfaces. The magnitude of these tension stresses are much higher than the ultimate strength of unreinforced carbonized materials. The material then fractures and a layer of material becomes structurally separated from the rest of the structure. Such structurally destructive mechanism is well known by those who have worked with High Energy (HE) explosives and is called spallation. The "bouncing" back and forth of the shock wave trapped within the structure thickness may cause spallation to occur near both the inner and outer surfaces, and theoretically over and over again (case of multiple spallations), until the shock wave dissipates itself because of the shock wave crests trapped in the spalled layers which cannot be reflected back into the remaining structure main body. Readers skilled in the art of analyzing shock wave transmission in solid elastic materials know that three basic ways and combinations thereof of preventing spallation—which must be avoided at all cost in the application herein described—are available. Briefly they are: (1) limiting the compression shock wave peak to the level of the material tensile strength, since in absolute magnitude the reflected tension shock wave peak can never exceed the initial compression shock wave peak, (2) diffracting the initial compression shock wave front so as to lower the peak of the reflected tension shock wave, and (3) augmenting the tensile strength of the material near the inner and outer surfaces.

The first solution is obvious, but cannot satisfy the application operational requirements and was unacceptable two decades ago. The third solution led to the development of the structural reinforcements in the third direction, i. e. along the structure thickness. The third solution can be demonstrated analytically and graphically by examining the shape variations that the shock wave goes through when it is reflected by a free surface and while it travels through heterogenous solid media. Such treatment is beyond the scope of this disclosure, but two pertinent conclusions need only be stated: (1) the slope of the front of an incoming compression shock wave affects the level of the peak of the reflected tension shock wave, i. e. the less abrupt the front is, the lower the peak of the tension stresses developed, and (2) the longer the compression shock wave is stretched out as it travels through the medium, the lower the compression shock wave peak is when it reaches the inner surface. The shock wave travels in the transmitting medium at the speed of sound in that medium. The sound speed in a solid elastic material is proportional to the square root of the ratio between the modulus of elasticity and the material density. The densities of the reinforcing fibers and filaments do not differ appreciably from that of the densified matrix material binding them. However, the modulii of elasticity of those two base materials vary greatly, being much higher for the graphite/carbon fibers and filaments. For that reason, shock waves travel faster along the spike fibers than they do through the stacked-up strands laid in a direction orthogonal to the propagation direction of the shock waves and in which filaments are separated by thin layers of binding matrix. However, the front of a shock wave travelling along a spike fiber segment reaches the fiber end before it can generally reach the structure inner surface. At this juncture, some of the compression shock wave is reflected back in that fiber as a tension shock wave and some is transmitted to the matrix as a fraction of the original compression shock wave, but ahead of the shock wave front which is travelling through strand-matrix material at a lower velocity. Furthermore, all spike fiber segments are of different length, which means that the above-described process takes place at different times. The consequence is the generation of a multitude of precursor compression "mini" shock waves ahead of the bulk of the compression shock wave front. This action results in two beneficial effects: (1) the abruptness of the shock wave front is blunted, and (2) the peak level of the shock wave front is reduced.

A similar interactive process takes place on the trailing side of the compression shock wave. The overall results are referred to here as diffraction. (for lack of a better word) in the spike axis direction. As readers skilled in the art know, the peak of the reflected tension shock wave results from a temporal combination of both front and trailing sides of the travelling compression shock wave when it reaches a free surface. For a given shock peak level at its origination time, the structure fabricated according to the invention will cause peak tension stresses created by the reflected tension shock wave to be appreciably reduced and attenuated by the combined effects of the two concomitant actions described above. Thus, either this structure is capable of withstanding more severe shock environments or it can survive a given shock environment with lesser damages being inflicted to the surviving structure, so that it has a higher chance of performing its task satisfactorily. The question remaining now is: how do spike discontinuities affect the composite material resistance to the tensile stresses developed as a result of the reflected tension shock wave propagation?

This question can best be answered by first considering the schematic drawing of FIG. 11 and the arrangement formed by the two left spikes 81 and spike 81" which realistically represents the relative positioning of a group of three typical contiguous spikes. The structural discontinuity between spikes 81 and spike 81" is evident. Statically, a tension loading oriented in the direction of any spike axis must be transmitted from spike 81" to spikes 81 by means of the matrix material. The tension loads are transmitted through shear loads resisted by the matrix material. Readers skilled in the art will know that the angles of the pointed ends of the spikes can be made small enough to provide shearing sectional areas large enough to transfer the tension loads carried by the spike cross-sections, as long as the tips of spikes 81" reach as far as the bases of the upper cones of the pointed ends of spikes 81, without causing damages to the matrix.

Now, if a tension shock wave travels upward in a direction opposite to arrow f for instance, static loads need not be transmitted from the spikes of one layer to the next layer spikes. The depth of the significant portion of the tension shock wave can realistically be represented by the distance between lines 98 and 99 or a fraction of the spike diameter, and an even smaller fraction of the spike length. Thus, at no time are discontinuities between spikes required to transmit any dynamic tension loads in a matrix shearing mode. These discontinuities however further disturb the planeness of the shock wave front, which is inconsequential if not advantageous as earlier mentioned. In summary, the structural discontinuities created in the radial reinforcements augment the material resistance to the type of shock dynamic loading assumed, by lowering the tensile stresses generated thereby, whilst still being capable of providing the same strength to resist static loads. This lengthy though simplified analysis of the problem that led to the development of three-dimensionally reinforced composite materials is used here to show that "certain" discontinuous radial reinforcements, if properly arranged in the manner provided by the present invention, will prove superior to the continuous radial reinforcement approaches which have been so far pursued by myself and others during the past two decades.

It will be clear from the foregoing that the various methods of fabricating spikes and inserting them into a structure being fabricated have been given solely by way of illustration and the invention can be modified in various ways depending upon the application intended for the structure. Also, of course, the apparatus described may be modified and adapted according to the shape of the three-dimensional article produced. Similarly, the sizes, general proportions and shapes of the spikes may be modified and adapted according to the structure thickness and the mode of loading to which it is to be subjected in its application. Strand winding is utilized herein as a method of forming the two-dimensional reinforcements but does not represent the only method of constructing the two-dimensionally reinforced layers. Such layers also be built by means of the laying of resin-impregnated fabric on a form. Successive fabric layers can then be penetrated by spikes according to the method of the invention. Conversely, the fabric can be pierced by the already inserted spikes projecting from a partially constructed structure as it is being laid. Such fabrication method of the two-dimensional reinforcements is particularly suitable for the production of flat bodies incorporating a discontinuous third reinforcement for the reasons already given. Such flat samples of this new composite material for laboratory-testing purpose would be less expensive to fabricate though approximating rather well the structural properties, statically and dynamically, of strand-wound composites.

It is thought that the method for fabricating and inserting reinforcing spikes in a 3-D reinforced structure and the apparatus therefor of the present invention and many of its attendant advantages will be understood from the foregoing description and discussion and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described my invention, I now claim:

1. A method of programmably reinforcing a thick three-dimensionally reinforced structure in which the third-dimensional substantially radial reinforcement includes short spikes oriented generally normally to said structure external surface, as said structure is being constructed, said method comprising the steps of:
   fabricating stiff spikes having two pointed ends and incorporating a plurality of parallel high-strength high-elasticity-modulus material fibers bonded together by a plastic resin;
   driving one of the two pointed ends of a spike inwardly into the structure being constructed so as to firmly secure said spike in the structure whilst enabling a portion of the spike length to protrude externally and substantially normally to the external surface of said structure as then existing;
   helically winding strands coated with plastic resin in layers in a controlled and programmed manner onto the existing structure along the sides of the spikes protruding therefrom;
   varying the helical winding angle so as to cause the strands in one layer to bisect the strands of another adjacent layer;
   building up the thickness of the layers of wound strands to the point where additional spikes are then programmed to be driven into the structure;
   repeatedly and alternatively winding additional strand layers and inwardly driving more spikes into the structure, until the required thickness of the structure has been obtained; and
   concurrently adjusting the rate at which the thickness of the strand wound layers is being built up and the rate at which the spikes are being added to the structure radial reinforcement.

2. The method recited in claim 1 in which said structure upon being dimensionally completed is heat treated, said treatment comprising the further steps of:
   curing the matrix material formed by the plastic resin contained in the structure; and
   machining and dimensioning the surfaces of the structure.

3. The method recited in claim 2 in which the machined and cured structure is further heat treated to carbonize the cured resin and then to densify the carbonized resin, said method comprising the further steps of:
   heating the structure a first time to temperatures such that the resin in the structure is slowly transformed into carbon, thus causing void pores to form between reinforcing fibers;

forcing a quantity of resin into the pores by applying heat and pressure simultaneously about the structure;

heating the structure a second time in a manner similar to that which was used the first time; and repeating the first, second and third steps sequentially until a specified density of the structure composite material is finally obtained.

4. The method recited in claim 1 in which the spike fabrication comprises the further steps of:

laying the fibers on a thin tape of partially-cured plastic resin to which the fibers are caused to adhere;

cutting generally trapezoidally-shaped elements of the tape and fiber assembly;

rolling each one of said trapezoidal elements along the longest one of the two parallel sides of the elements so as to cause the shortest side to end on the external surface of the spike thus formed, thereby forming the two pointed ends of the spike;

applying heat and pressure simultaneously on the spike so as to eliminate voids and excess resin between the fibers, while finishing the curing process of said resin; and trimming and shaping both pointed ends of the spike.

5. The method recited in claim 1 in which the spike fabrication comprises the further steps of:

continuously laying fibers on a thin tape of partially-cured plastic resin film to which the fibers are caused to adhere;

causing one end of the tape to continuously roll up and acquire a coil-shaped cross-section to form a rod-like composite;

pulling the rod-like tape-and-fiber composite assembly; applying simultaneously heat and pressure on said assembly to finish curing the resin and eliminate voids in the composite;

cutting short elements of the composite assembly; and trimming and shaping both pointed ends of each one of said elements so as to obtain double-pointed-end spikes.

6. The method recited in claim 1 in which the spike fabrication comprises the further steps of:

preparing batches of resin coated fiber segments of varied length, the number of segments of a given length in a batch being such as to obtain a specified number/length numerical distribution of the fiber segments in each batch;

depositing each batch in a receptacle formed by a continuous thin tape having a U-shaped cross-section and made of partially cured plastic resin;

causing the open upper end of the U-shaped cross-section to close so as to entrap the fiber segment batch at the bottom end;

applying heat and pressure simultaneously on the batch of fiber segments entrapped in each receptacle so as to cause the resin to complete its curing and bond the fibers together, eliminating thereby voids in the composite thus formed;

trimming the tab formed by the closed upper portion of the receptacle; and completing the shaping of both ends of each receptacle composite so as to obtain double-pointed-end spikes.

7. The method recited in claim 1 in which the driving of a spike into the structure is accomplished by means of a gas gun, said method comprising the further steps of:

automatically supplying spikes for loading in the gun barrel;

positioning the gun barrel relatively to the structure;

causing gas under pressure to be admitted behind one end of the spike;

causing the structure motion to stop briefly;

discharging the gun barrel and thus enabling the spike to impact the external surface of the structure at the location selected and at the angle required; and causing the structure to resume its motion.

8. The method recited in claim 7 in which an indentation is prepunched in the structure at the location and at the angle specified for receiving a spike immediately before the gun barrel is positioned for discharging said spike, said method comprising the further steps of:

positioning a punching tool for impacting the structure at the specified location and angle;

causing the structure motion to stop briefly;

actuating the punching tool; and removing the punching tool so as to enable the positioning of the gas gun.

9. The method recited in claim 1 in which means is provided for driving the spike into the structure mechanically, said method comprising the further steps of:

automatically supplying spikes to the spike driving means;

introducing a spike into a holding chamber having a hammer located at one of its two ends behind the spike;

positioning the other open end of the chamber so as to cause the spike to impact the structure at a specified location and angle when the spike is driven by the hammer;

causing the structure motion to stop briefly;

advancing the hammer chamber so that its open end nearly contacts the external surface of the structure;

actuating the hammer, thus causing the spike to penetrate into the structure;

retracting the hammer chamber; and causing the structure to resume its motion.

10. The method recited in claim 9 in which means is provided for orienting the spike-holding chamber about the spike axis with respect to the structure axis so as to give the sides of spikes having lozenge-shaped cross-sections a preferred direction parallel to the wound strands for enabling better contacts between spikes and strands, said method comprising the further steps of:

orienting the spike cross-section in the holding chamber;

rotating the holding chamber to a programmed orientation; and enabling the holding chamber to maintain said orientation as the spike is being hammered into the structure.

11. The method recited in claim 1 in which means is provided for coordinating and synchronizing the operations of means for winding the strands, means for fabricating the spikes and means for driving the spikes so as to vary the natures and proportions of strand and spike reinforcements throughout the structure according to a specified programmed schedule, whereby the structure material characteristics are optimized according to location within the completed structure of said material, said method comprising the further steps of:

measuring the structure thickness at each one of all locations where spikes are to be driven into the structure, prior to driving said spikes;

recording and storing said thickness measurements in a central processing unit memory means for determining the state of advancement of the structure construction;

concurrently and simultaneously adjusting the winding angle of the strands, their sizes and their compositions according to a programmed schedule as a function of the location on the presently existing external surface of the structure where a specified portion of each strand is to be laid;

concurrently and simultaneously adjusting the angular displacements of the structure relatively to the strand winding means so as to prevent side loads from being applied by the strands on the protruding portion of the spikes prior to said strands being laid in place on the structure external surface; and stopping the strand winding process when the structure thickness has reached its programmed schedule values at all locations on the structure external surface.

12. The method recited in claim 1 in which the spike fabrication comprises the further steps of:

preparing batches of resin coated fiber segments of varied length, the number of segments of a given length in a batch being such as to yield a specified number/length numerical distribution of the fiber segments in each batch;

depositing each batch as a bunch of segments parallel to one another on a continuous thin tape made of partially cured resin and slightly wider than the length of the longest segment in any batch, and perpendicularly to the direction in which said tape is caused to advance after the deposition of a batch;

causing the free end of the tape located near a first side of the batch to curl up so as to entrap the bunch of segments inside a receptacle formed when the curled-up tape free end is caused to meet and adhere to the tape surface located on a second side of the batch so as to close the receptacle;

sealing the two ends of the receptacle;

cutting the closed sealed receptacle off the tape;

collecting the then formed and free receptacle on conveying for further handling;

applying heat and pressure simultaneously on the closed sealed receptacle so as to cause the resin to complete its curing, to bond the fiber segments together and to eliminate voids created therein; and completing the shaping of both ends of each fiber-segment-filled receptacle so as to obtain double-pointed-end spikes.

13. The method recited in claim 1 in which means is provided for tamping wound-strands laid between contiguous spikes so as to increase the compaction of the strands, said method comprising the further steps of:

positioning the tamping means between contiguous spikes;

stopping the strand winding;

engaging a tamper projecting from the tamping means;

actuating the tamper;

stopping the strand tamping;

retracting the tamper; and resuming the strand winding.

* * * * *